United States Patent
Maeda et al.

(10) Patent No.: US 10,902,849 B2
(45) Date of Patent: Jan. 26, 2021

(54) NON-TRANSITORY COMPUTER-READABLE STORAGE MEDIUM, INFORMATION PROCESSING APPARATUS, AND UTTERANCE CONTROL METHOD

(71) Applicant: FUJITSU LIMITED, Kawasaki (JP)

(72) Inventors: Kenichiro Maeda, Kawasaki (JP); Masaki Miura, Kawasaki (JP); Makoto Hyuga, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 15/935,377

(22) Filed: Mar. 26, 2018

(65) Prior Publication Data

US 2018/0286399 A1 Oct. 4, 2018

(30) Foreign Application Priority Data

Mar. 29, 2017 (JP) ................................. 2017-065157

(51) Int. Cl.
| | |
|---|---|
| *G10L 15/22* | (2006.01) |
| *B25J 11/00* | (2006.01) |
| *G06F 3/16* | (2006.01) |
| *G10L 15/18* | (2013.01) |
| *G06N 3/00* | (2006.01) |

(52) U.S. Cl.
CPC ........... *G10L 15/22* (2013.01); *B25J 11/0005* (2013.01); *G06F 3/16* (2013.01); *G06F 3/167* (2013.01); *G06N 3/008* (2013.01); *G10L 15/1822* (2013.01); *G10L 2015/223* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 7,899,671 | B2 * | 3/2011 | Cooper | G10L 15/065 704/252 |
| 8,626,511 | B2 * | 1/2014 | LeBeau | G10L 15/30 704/270 |
| 9,142,215 | B2 * | 9/2015 | Rosner | G10L 15/26 |
| 10,218,834 | B2 * | 2/2019 | Ham | H04M 1/72533 |

(Continued)

FOREIGN PATENT DOCUMENTS

| | | |
|---|---|---|
| JP | 2007-219149 | 8/2007 |
| JP | 2008-158697 | 7/2008 |
| JP | 2014-6663 | 1/2014 |

*Primary Examiner* — Thuykhanh Le
(74) *Attorney, Agent, or Firm* — Fujitsu Patent Center

(57) ABSTRACT

A non-transitory computer-readable storage medium storing a program that causes a computer to execute a process, the computer controlling an utterance of a robot, the process including detecting an utterance of a person by using a microphone, obtaining, in response to the detecting, pieces of response information for the utterance of the person based on first information indicating a content of the utterance of the person, obtaining second information relating to at least one of the person and a motion of the person other than the utterance of the person, selecting specified response information among the pieces of response information based on the second information, and transmitting, to the robot, an instruction that causes the robot to execute a response in accordance with the specified response information.

10 Claims, 28 Drawing Sheets

(56) References Cited

U.S. PATENT DOCUMENTS

| | | | |
|---|---|---|---|
| 2004/0193403 A1* | 9/2004 | Creamer | G10L 15/1815 704/201 |
| 2004/0236580 A1* | 11/2004 | Bennett | G10L 15/22 704/270.1 |
| 2005/0177376 A1* | 8/2005 | Cooper | G10L 15/065 704/277 |
| 2008/0319751 A1* | 12/2008 | Kennewick | G10L 15/1822 704/257 |
| 2010/0131277 A1* | 5/2010 | Nakano | G10L 15/22 704/270 |
| 2011/0184730 A1* | 7/2011 | LeBeau | G10L 15/30 704/201 |
| 2011/0196677 A1* | 8/2011 | Deshnnukh | G10L 15/22 704/246 |
| 2013/0024408 A1* | 1/2013 | Firminger | G06Q 10/06 706/17 |
| 2013/0183944 A1* | 7/2013 | Mozer | H04L 12/282 455/414.1 |
| 2013/0332172 A1* | 12/2013 | Prakash | H04M 1/72527 704/270.1 |
| 2013/0339028 A1* | 12/2013 | Rosner | H04R 29/004 704/275 |
| 2014/0025383 A1* | 1/2014 | Dai | G10L 25/63 704/260 |
| 2014/0140497 A1* | 5/2014 | Ripa | H04M 3/5133 379/265.06 |
| 2014/0163960 A1* | 6/2014 | Dimitriadis | G10L 25/48 704/9 |
| 2014/0278343 A1* | 9/2014 | Tran | G06F 40/53 704/2 |
| 2014/0278400 A1* | 9/2014 | Coussemaeker | G06F 16/9535 704/235 |
| 2014/0365226 A1* | 12/2014 | Sinha | H04M 1/72519 704/275 |
| 2015/0019074 A1* | 1/2015 | Winter | B60K 37/06 701/36 |
| 2015/0053781 A1* | 2/2015 | Nelson | F24F 11/30 236/1 C |
| 2015/0066479 A1* | 3/2015 | Pasupalak | G06F 40/20 704/9 |
| 2015/0100581 A1* | 4/2015 | O'Donnell | H04L 67/10 707/737 |
| 2015/0154976 A1* | 6/2015 | Mutagi | H04L 12/281 704/275 |
| 2015/0162007 A1* | 6/2015 | Hwang | G10L 17/00 704/273 |
| 2015/0170643 A1* | 6/2015 | Nicholson | G10L 15/22 704/254 |
| 2015/0186780 A1* | 7/2015 | Zhang | G06F 16/686 706/12 |
| 2015/0297109 A1* | 10/2015 | Garten | A61B 5/0482 600/544 |
| 2015/0310849 A1* | 10/2015 | Onishi | G10L 13/027 704/258 |
| 2015/0340042 A1* | 11/2015 | Sejnoha | G10L 17/22 704/275 |
| 2016/0042226 A1* | 2/2016 | Cunico | G06K 9/00315 382/103 |
| 2016/0042281 A1* | 2/2016 | Cunico | G06K 9/00221 706/11 |
| 2016/0062988 A1* | 3/2016 | Allen | G06F 16/33 704/9 |
| 2016/0162807 A1* | 6/2016 | Smailagic | G06K 9/6281 706/12 |
| 2016/0163332 A1* | 6/2016 | Un | G10L 13/033 704/260 |
| 2016/0287166 A1* | 10/2016 | Tran | A61B 5/165 |
| 2016/0379622 A1* | 12/2016 | Patel | G10L 13/033 704/260 |
| 2017/0060994 A1* | 3/2017 | Byron | G06F 16/3344 |
| 2017/0061667 A1* | 3/2017 | Miller | G06Q 10/00 |
| 2017/0068423 A1* | 3/2017 | Napolitano | G06F 3/167 |
| 2017/0103755 A1* | 4/2017 | Jeon | H04L 12/2821 |
| 2017/0160813 A1* | 6/2017 | Divakaran | G10L 15/1815 |
| 2017/0264950 A1* | 9/2017 | Gerhards | G06F 11/1448 |
| 2018/0001470 A1* | 1/2018 | Rusu | G06N 20/00 |
| 2018/0040046 A1* | 2/2018 | Gotoh | G06Q 30/0623 |
| 2018/0053503 A1* | 2/2018 | Ogunyoku | G08B 25/016 |
| 2018/0151176 A1* | 5/2018 | Qian | G06F 3/017 |
| 2018/0191890 A1* | 7/2018 | Ham | H04M 1/725 |
| 2018/0226070 A1* | 8/2018 | Gorzela | G10L 25/63 |
| 2018/0255419 A1* | 9/2018 | Canavor | H04L 63/107 |
| 2018/0331839 A1* | 11/2018 | Gao | G06Q 10/107 |
| 2019/0197755 A1* | 6/2019 | Vats | G06T 13/205 |

* cited by examiner

FIG. 15

| ITEM NUMBER | INFORMATION TYPE | VALUE | KEYWORD |
|---|---|---|---|
| 1 | USER'S FACIAL EXPRESSION | 0.23,0.71,-0.18 | SMILE |
| 2 | TEMPERATURE | 4 | COLD |
| 3 | WEATHER | 6.7,0.25 | CLOUDY |
| ... | ... | ... | ... |

FIG. 16

| ITEM NUMBER | USER IDENTIFICATION INFORMATION | CONTENT OF UTTERANCE |
|---|---|---|
| 1 | 003 | TOMORROW IS FRIEND'S BIRTH DAY |

FIG. 17

| ITEM NUMBER | INFORMATION TYPE | KEYWORD |
|---|---|---|
| 1 | FOOD | ICE CREAM |
| 2 | SPORT | SOCCER |
| 3 | SEASON | SUMMER |
| 4 | MUSIC | J-POP |
| ... | ... | ... |

FIG. 18

| ITEM NUMBER | TOPIC |
|---|---|
| 1 | WHICH ICE CREAM SHOP YOU VISITED RECENTLY? |
| 2 | GOOD SMILE! GOT ANYTHING GOOD? |
| 3 | NEW SINGLE OF XXX IS RELEASED ON X-TH DAY OF O MONTH |
| 4 | WHAT PRESENT YOU GIVE? |
| ... | ... |

FIG. 19

| ITEM NUMBER | TOPIC |
|---|---|
| 1 | WHICH ICE CREAM SHOP YOU VISITED RECENTLY? |
| 2 | GOOD SMILE! GOT ANYTHING GOOD? |
| 3 | NEW SINGLE OF XXX WILL BE RELEASED AT END OF NEXT WEEK |
| 4 | WHAT PRESENT YOU GIVE? |
| ... | ... |

FIG. 20A $$\begin{pmatrix} 0.23 \\ 0.71 \\ -0.18 \\ 4 \\ 6.7 \\ 0.25 \end{pmatrix}$$
$\vdots$

FIG. 20B $$\begin{pmatrix} 0.82 \\ 0.34 \\ 0.41 \\ 25 \\ -1.4 \\ 12 \end{pmatrix}$$
$\vdots$

FIG. 21

$$(0.23, 0.71, -0.18.4.6.7, 0.25\cdots) \cdot \begin{pmatrix} 0.82 \\ 0.34 \\ 0.41 \\ 25 \\ -1.4 \\ 12 \\ \vdots \end{pmatrix} = 4.21$$

FIG. 22

| ITEM NUMBER | TOPIC | USER'S REACTION |
|---|---|---|
| 1 | TODAY IS HOTTER THAN YESTERDAY | SMILE |
| 2 | YYY TEAM WON | SMILE |
| 3 | GOOD SMILE! GOT ANYTHING GOOD? | ANGER |

FIG. 23

| ITEM NUMBER | TOPIC | USER'S REACTION |
|---|---|---|
| 1 | TODAY IS HOTTER THAN YESTERDAY | SMILE |
| 2 | YYY TEAM WON | SMILE |
| 3 | GOOD SMILE! GOT ANYTHING GOOD? | ANGER |
| 4 | WHAT PRESENT YOU GIVE? | SMILE |

FIG. 27

| ITEM NUMBER | TOPIC |
|---|---|
| 1 | WHICH ICE CREAM YOU VISITED RECENTLY |
| 2 | GOOD SMILE! GOT ANYTHING GOOD? |
| 3 | NEW SINGLE OF XXX IS RELEASED ON X-TH DAY OF O MONTH |
| ... | ... |

FIG. 28

| ITEM NUMBER | TOPIC |
|---|---|
| 1 | WHICH ICE CREAM YOU VISITED RECENTLY |
| 2 | GOOD SMILE! GOT ANYTHING GOOD? |
| 3 | NEW SINGLE OF XXX IS RELEASED ON X-TH DAY OF O MONTH |
| 4 | SILENCE |
| ... | ... | ies # NON-TRANSITORY COMPUTER-READABLE STORAGE MEDIUM, INFORMATION PROCESSING APPARATUS, AND UTTERANCE CONTROL METHOD

CROSS-REFERENCE TO RELATED APPLICATION

This application is based upon and claims the benefit of priority of the prior Japanese Patent Application No. 2017-65157, filed on Mar. 29, 2017, the entire contents of which are incorporated herein by reference.

FIELD

The embodiments discussed herein are related to a non-transitory computer-readable storage medium, an information processing apparatus, and an utterance control method.

BACKGROUND

In recent years, researches have been made on robots capable of communicating with the user by uttering to the user (hereinafter, also referred to simply as "person").

Specifically, such a robot determines the content of utterance based on the content of utterance made by the user and various types of information (for example, time zone, weather, facial expression of the user, and hobby or interest of the user). Then, the robot utters to the user based on the determined content (see for example Japanese Laid-open Patent Publication Nos. 2008-158697, 2007-219149, and 2014-006663).

SUMMARY

According to an aspect of the invention, a non-transitory computer-readable storage medium storing a program that causes a computer to execute a process, the computer controlling an utterance of a robot, the process including detecting an utterance of a person by using a microphone, obtaining, in response to the detecting, pieces of response information for the utterance of the person based on first information indicating a content of the utterance of the person, obtaining second information relating to at least one of the person and a motion of the person other than the utterance of the person, selecting specified response information among the pieces of response information based on the second information, and transmitting, to the robot, an instruction that causes the robot to execute a response in accordance with the specified response information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram for describing a specific example of second acquisition information;

FIG. 16 is a diagram for describing a specific example of the information acquired in the processing of S22;

FIG. 17 is a diagram for describing a specific example of preference information;

FIG. 18 is a diagram for describing a specific example of topic information;

FIG. 19 is a diagram for describing a specific example of topic information subjected to a processing of S26;

FIG. 20A is a diagram for illustrating a specific example of current vector information;

FIG. 20B is a diagram for describing a specific example of topic vector information;

FIG. 21 is a diagram for describing a specific example of a processing of S53;

FIG. 22 is a diagram for describing a specific example of accumulated information;

FIG. 23 is a diagram for describing a specific example of the accumulated information;

FIG. 27 is a diagram for illustrating a specific example of topic information according to the second embodiment; and FIG. 28 is a diagram for illustrating a specific example of topic information with added information indicating silence in a processing of S66.

DESCRIPTION OF EMBODIMENTS

Such a robot, for example, may utter a content not suitable to current situation of the user when unable to acquire sufficient information for determining the content of utterance. Therefore, there is a demand for the development of a robot which may utter a content suitable for the user's current action, state, or situation even when acquired information is not sufficient.

According to one aspect of the present disclosure, it is an object of the present disclosure to provide an utterance control program, an information processing apparatus, and an utterance control method, which cause a robot to utter a topic suitable for the action, state or situation of a person.

One aspect of the present disclosure causes a robot to utter a topic according to the action, state or situation of a person.

[Configuration of Information Processing System]

Figure 1:
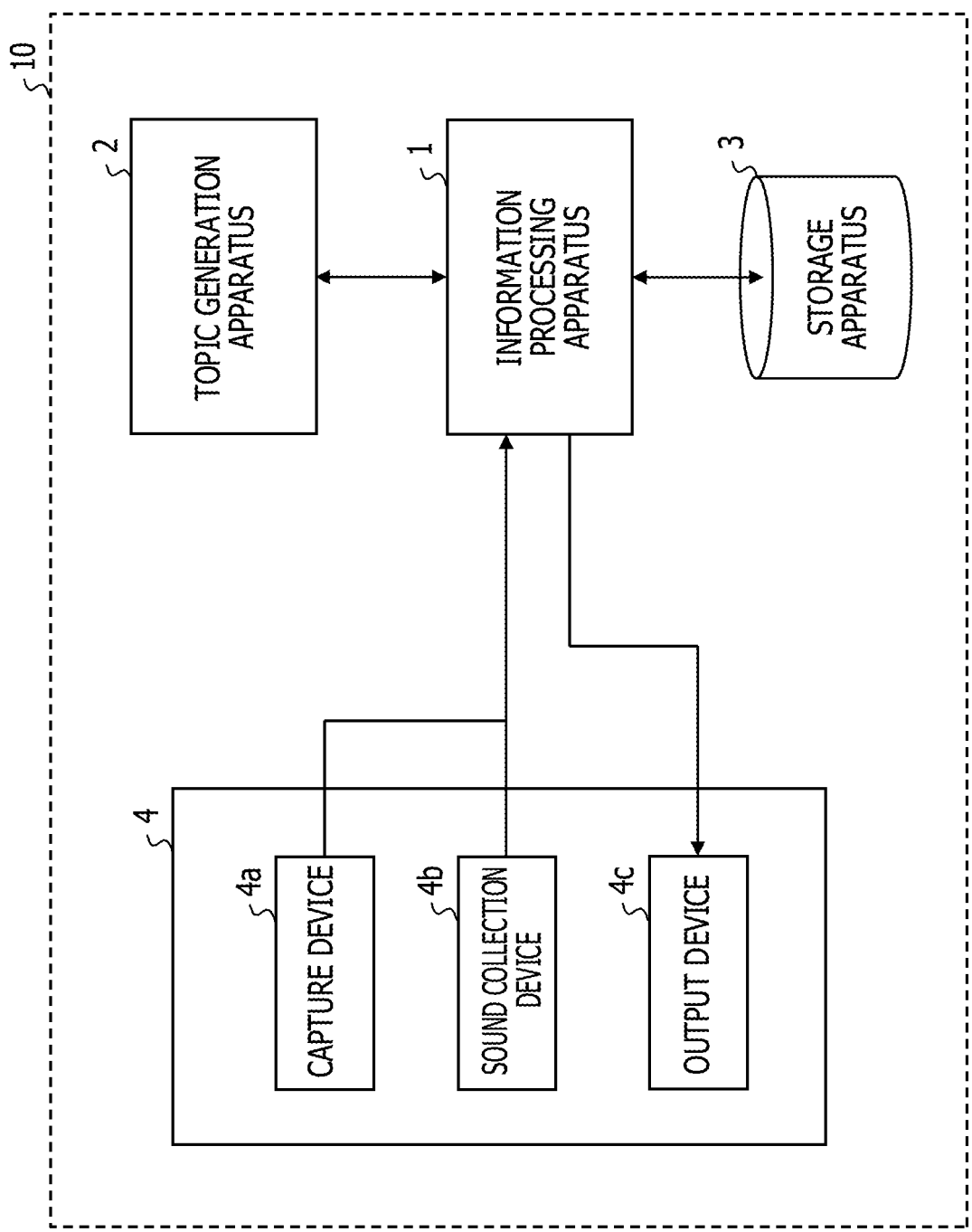
FIG. 1 illustrates a general configuration of an information processing system.

FIG. 1 illustrates a general configuration of an information processing system 10. The information processing system 10 illustrated in FIG. 1 includes an information processing apparatus 1 (hereinafter alternatively referred to as utterance control apparatus 1), a topic generation apparatus 2, a storage apparatus 3, and a robot 4.

Specifically, the robot 4 includes, for example, a capture device 4a such as a camera, a sound collection device 4b such as a microphone, and an output device 4c such as a speaker. The robot 4 may include, for example, various sensors such as a temperature sensor, in addition to the capture device 4a, the sound collection device 4b, and the output device 4c.

The information processing apparatus 1 and the topic generation apparatus 2 respectively comprise a plurality of physical machines including a central computing unit (CPU), a dynamic random access memory (DRAM), and a hard disk drive (HDD).

The information processing apparatus 1, for example, acquires various information related to the user and the peripheral of the user via the capture device 4a at regular intervals, and stores acquired information into the storage apparatus 3. Then, for example, when the user utters, the information processing apparatus 1 acquires the content of the utterance via the sound collection device 4b, and transmits information indicating the acquired content of the utterance and information stored in the storage apparatus 3 to the topic generation apparatus 2.

The topic generation apparatus 2 generates a topic suitable for the received information based on the information received from the information processing apparatus 1. Specifically, for example, the topic generation apparatus 2 acquires information corresponding to user's preference information contained in the information received from the information processing apparatus 1 via Internet externally, and generates a topic based on the information received from the information processing apparatus 1 and the information received externally. Then, the topic generation apparatus 2 transmits the generated topic to the information processing apparatus 1.

Thereafter, upon reception of the topic from the topic generation apparatus 2, the information processing apparatus 1 executes an utterance according to the received topic. Specifically, the information processing apparatus 1 outputs the content of the utterance corresponding to the received topic via the output device 4c.

Thus, the information processing apparatus 1 (or robot 4) may have a dialogue to communicate with the user.

Here, for example, the above robot 4 may utter a content not suitable for the user's current situation when information which is acquirable, for example, from the capture device 4a is not sufficient. Therefore, there is a demand for the development of the robot 4 which may utter the content according to the user's current situation, for example, based on acquirable information.

To meet this demand, the information processing apparatus 1 according to this embodiment acquires information related to the user's utterance, action, state or situation (hereinafter alternatively referred to first information or first acquisition information) and information related to the user's action, state or situation (hereinafter alternatively referred to as second information or second acquisition information). Then, the information processing apparatus 1 transmits the acquired first acquisition information to the topic generation apparatus 2 which generates the topic.

Thereafter, the information processing apparatus 1, which has acquired a plurality of topics generated by the topic generation apparatus 2 based on the first acquisition information, identifies a topic corresponding to the acquired second acquisition information out of the acquired plurality of topics. Further, the information processing apparatus 1 outputs an instruction which causes the robot 4 to execute an utterance corresponding to the identified topic.

More specifically, for example, the topic generation apparatus 2 generates a plurality of topics in advance based on, for example, the content of user's utterance (first acquisition information). Then, the information processing apparatus 1, for example, identifies a topic more suitable as a topic to be uttered to the user among the plurality of topics generated by the topic generation apparatus 2, based on, for example, the user's current situation (second acquisition information). Thereafter, the robot 4 executes an utterance corresponding to the topic identified by the information processing apparatus 1.

Thus, the information processing apparatus 1 may cause the robot 4 to utter a topic according to the user's action, state, or situation.

[Hardware Configuration of Information Processing System]

Figure 2:
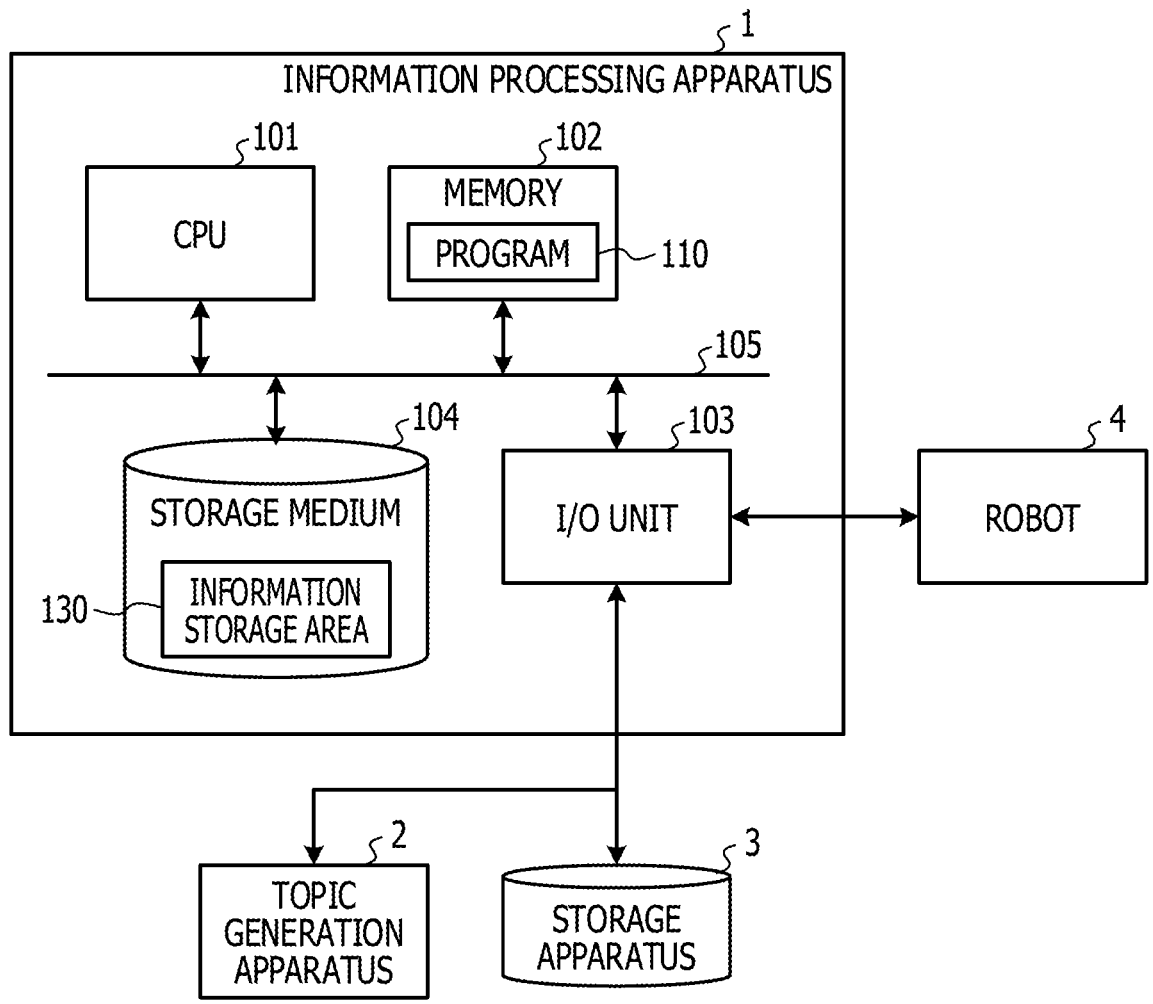
FIG. 2 is a diagram for describing a hardware configuration of an information processing apparatus.
Figure 3:
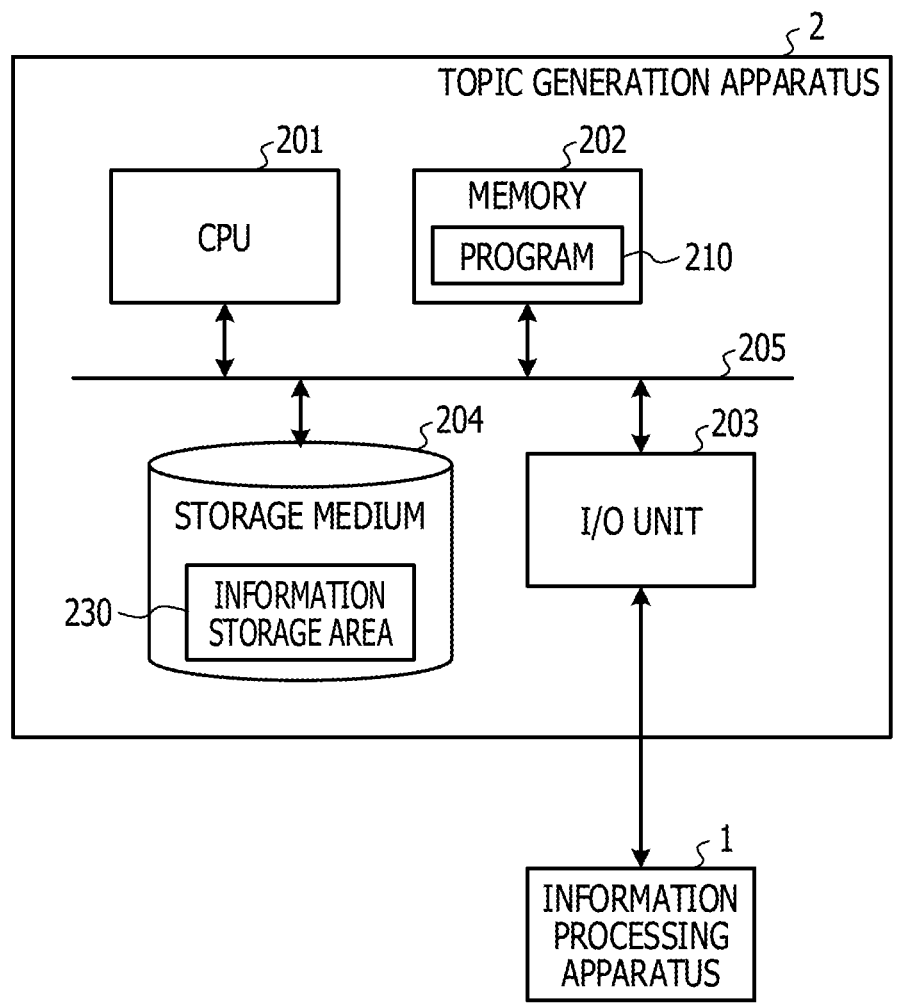
FIG. 3 is a diagram for describing a hardware configuration of a topic generation apparatus.

Next, a hardware configuration of the information processing system 10 is described. FIG. 2 is a diagram for describing a hardware configuration of the information processing apparatus 1. FIG. 3 is a diagram for describing a hardware configuration of a topic generation apparatus 2.

First, a hardware configuration of the information processing apparatus 1 is described.

As illustrated in FIG. 2, the information processing apparatus 1 includes a CPU 101 which is a processor, a memory 102, an external interface (I/O unit) 103, and a storage medium (hard disk) 104. Respective components are coupled with each other via a bus 105.

The storage medium 104 stores a program 110 for executing a processing of controlling the content of utterance (hereinafter alternatively referred to as utterance control processing) by the robot 4 into a program storage area (not illustrated) within the storage medium 104.

As illustrated in FIG. 2, the CPU 101 loads the program 110 from the storage medium 104 into the memory 102 during execution of the program 110, and executes the utterance control processing in cooperation with the program 110.

The storage medium 104 includes, for example, an information storage area 130 (hereinafter alternatively referred to as storage unit 130) which stores information used to perform the utterance control processing.

The external interface 103 (I/O unit 103) communicates with the topic generation apparatus 2, the storage apparatus 3, and the robot 4.

Next, a hardware configuration of the topic generation apparatus 2 is described.

As illustrated in FIG. 3, the topic generation apparatus 2 includes a CPU 201 which is a processor, a memory 202, an external interface (I/O unit) 203, and a storage medium (hard disk) 204. Respective components are coupled with one another via a bus 205.

The storage medium 204 stores a program 210 for performing the utterance control processing into a program storage area (not illustrated) within the storage medium 204.

As illustrated in FIG. 3, the CPU 201 loads the program 210 from the storage medium 204 into the memory 202 during execution of the program 210, and executes the utterance control processing in cooperation with the program 210.

The storage medium 204 includes, for example, an information storage area 230 (hereinafter alternatively referred to as storage unit 230) which stores information used to perform the utterance control processing.

The external interface 203 (I/O unit 203) communicates with the information processing apparatus 1.

[Software Configuration of Information Processing System]

Figure 4:
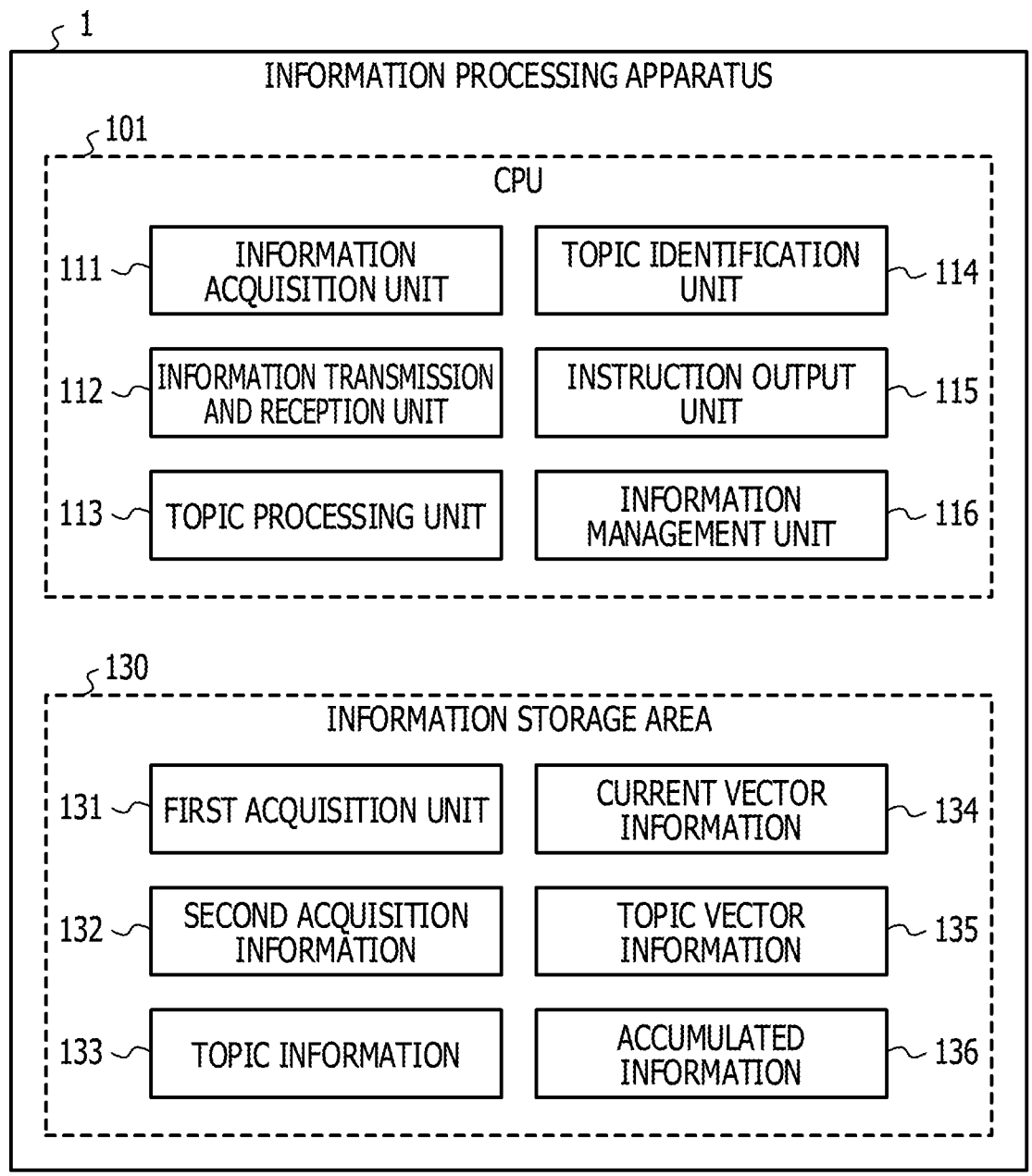
FIG. 4 is a functional block diagram of the information processing apparatus.
Figure 5:
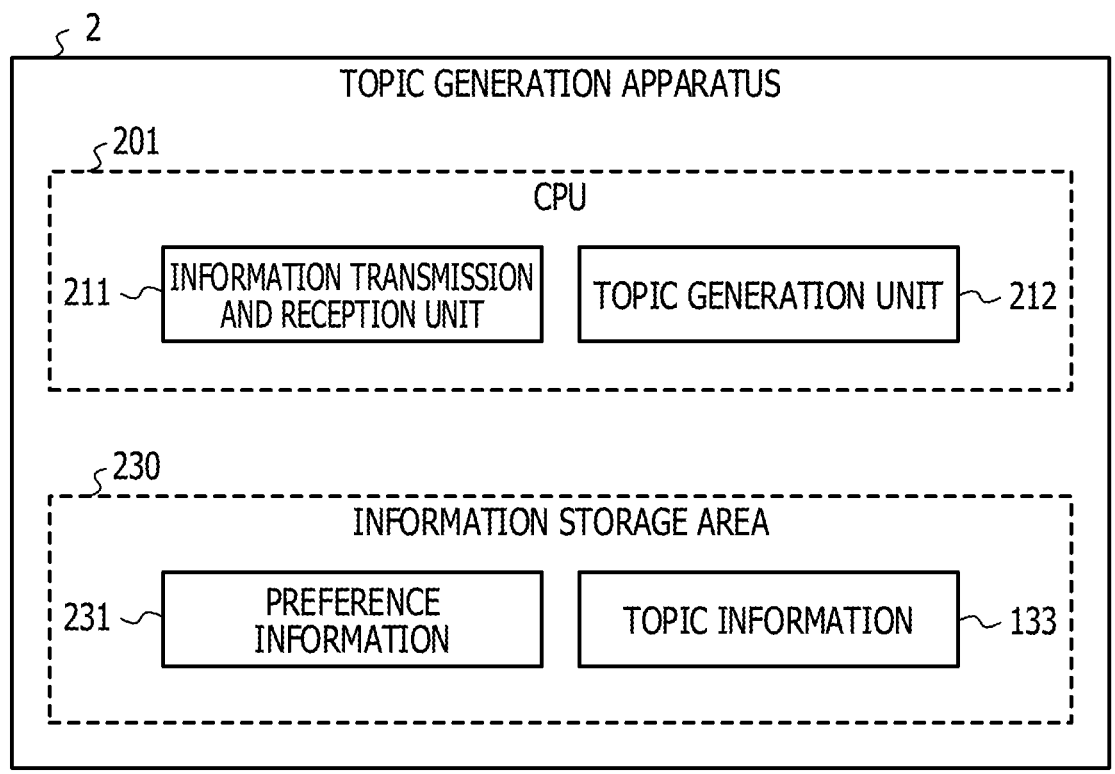
FIG. 5 is a functional block diagram of a topic generation apparatus.

Next, a software configuration of the information processing system 10 is described. FIG. 4 is a functional block diagram of the information processing apparatus 1. FIG. 5 is a block diagram of the topic generation apparatus 2.

First, the functional block diagram of the information processing apparatus 1 is described.

As illustrated in FIG. 4, the CPU 101 operates, in cooperation with the program 110, as an information acquisition unit 111, an information transmission and reception unit 112, a topic processing unit 113, a topic identification unit 114, an instruction output unit 115, and an information management unit 116. As illustrated in FIG. 4, the information storage area 130 stores first acquisition information 131, second acquisition information 132, topic information 133, current vector information 134, topic vector information 135, and accumulated information 136.

The information acquisition unit 111 acquires the first acquisition information 131 and the second acquisition information 132 related to the user. Specifically, for example, the information acquisition unit 111 acquires information related to the user's utterance, action, state, or situation from the sound collection device 4b, and acquires the first acquisition information 131 by generating the first acquisition information 131 from the acquired information. For example, the information acquisition unit 111 acquires information related to the user's action, state, or situation, for example, from the capture device 4a, and acquires the second acquisition information 132 by generating the second acquisition information 132 from the acquired information. Then, for example, the information acquisition unit 111 stores the acquired first acquisition information 131 and second acquisition information 132 into the information storage area 130. The first acquisition information 131 and the second acquisition information 132 respectively may include the same information or may comprise completely different information.

The information transmission and reception unit 112 transmits the first acquisition information 131 acquired by the information acquisition unit 111 to the topic generation apparatus 2 which generates the topic information 133 including information indicating the content of the topic (topic candidate). Specifically, for example, the information transmission and reception unit 112 transmits the acquired first acquisition information 131 to the topic generation apparatus 2 upon acquisition of the first acquisition information 131 by the information acquisition unit 111. For example, the information transmission and reception unit 112 transmits the acquired first acquisition information 131 to the topic generation apparatus 2 upon elapse of a predetermined period of time from the user's last utterance. Thereafter, the information transmission and reception unit 112 acquires the topic information 133 generated by the topic generation apparatus 2.

For example, when the information transmission and reception unit 112 receives the topic information 133 from the topic generation apparatus 2, the topic processing unit 113 processes the content of the acquired topic information 133 to a content suitable for the utterance to the user.

For example, after the topic processing unit 113 processes the topic information 133, the topic identification unit 114 identifies topic information 133 corresponding to the second acquisition information 132 stored in the information storage area 130 out of the topic information 133 subjected to the processing.

The instruction output unit 115 outputs an instruction which causes the robot 4 to utter according to the topic information 133 identified by the topic identification unit 114.

After the robot 4 utters, the information acquisition unit 111 acquires information related to the user's state (expression). Then, upon acquisition of the information related to the user's state by the information acquisition unit 111, the information management unit 116 generates the accumulated information 136. The accumulated information 136 is information associating the information related to the acquired user's state and the topic information 133 identified by the topic identification unit 114 with each other. Thereafter, the information management unit 116 stores the generated accumulated information 136 into the information storage area 130. The current vector information 134 and the topic vector information 135 are described later.

Next, a functional block diagram of the topic generation apparatus 2 is described.

As illustrated in FIG. 5, the CPU 201 operates as an information transmission and reception unit 211 and a topic generation unit 212 in cooperation with the program 210. As illustrated in FIG. 5, the information storage area 230 stores preference information 231 and topic information 133.

The information transmission and reception unit 211 receives the first acquisition information 131 transmitted from the information processing apparatus 1.

The topic generation unit 212 generates topic information 133 upon reception of the first acquisition information 131 by the information transmission and reception unit 211. Then, for example, the topic generation unit 212 stores the generated topic information 133 into the information storage area 230.

Specifically, for example, the topic generation unit 212 refers to the information storage area 230, and acquires the preference information 231 which is information related to the user's hobby or interest corresponding to the received first acquisition information 131. Then, the topic generation unit 212 acquires information corresponding to the acquired preference information 231 via Internet externally. Thereafter, the topic generation unit 212 generates the topic information 133 based on the first acquisition information 131 received from the information processing apparatus 1 and the information acquired externally.

For example, the preference information 231 may be stored into the information storage area 230 by the user in advance. When the information transmission and reception unit 211 receives the second acquisition information 132 in addition to the first acquisition information 131, the topic generation unit 212 may generate the topic information 133 based on the first acquisition information 131, the second acquisition information 132, and the information acquired externally.

Thereafter, the information transmission and reception unit 211 transmits the topic information 133 generated by the topic generation unit 212 to the information processing apparatus 1.

The information processing system 10 illustrated in FIG. 1 includes the information processing apparatus 1 and the topic generation apparatus 2. On the other hand, for example, the information processing system 10 may not include the topic generation apparatus 2, and, instead, cause the information processing apparatus 1 to implement functions of the topic generation apparatus 2. More specifically, the CPU 101 of the information processing apparatus 1 may operate as the topic generation unit 212.

Also, the information processing system 10 illustrated in FIG. 1 may include a plurality of topic generation apparatuses 2. Further, the robot 4 described with reference to FIG. 1 may include the information processing apparatus 1 and the topic generation apparatus 2.

Overview of First Embodiment

Figure 6:
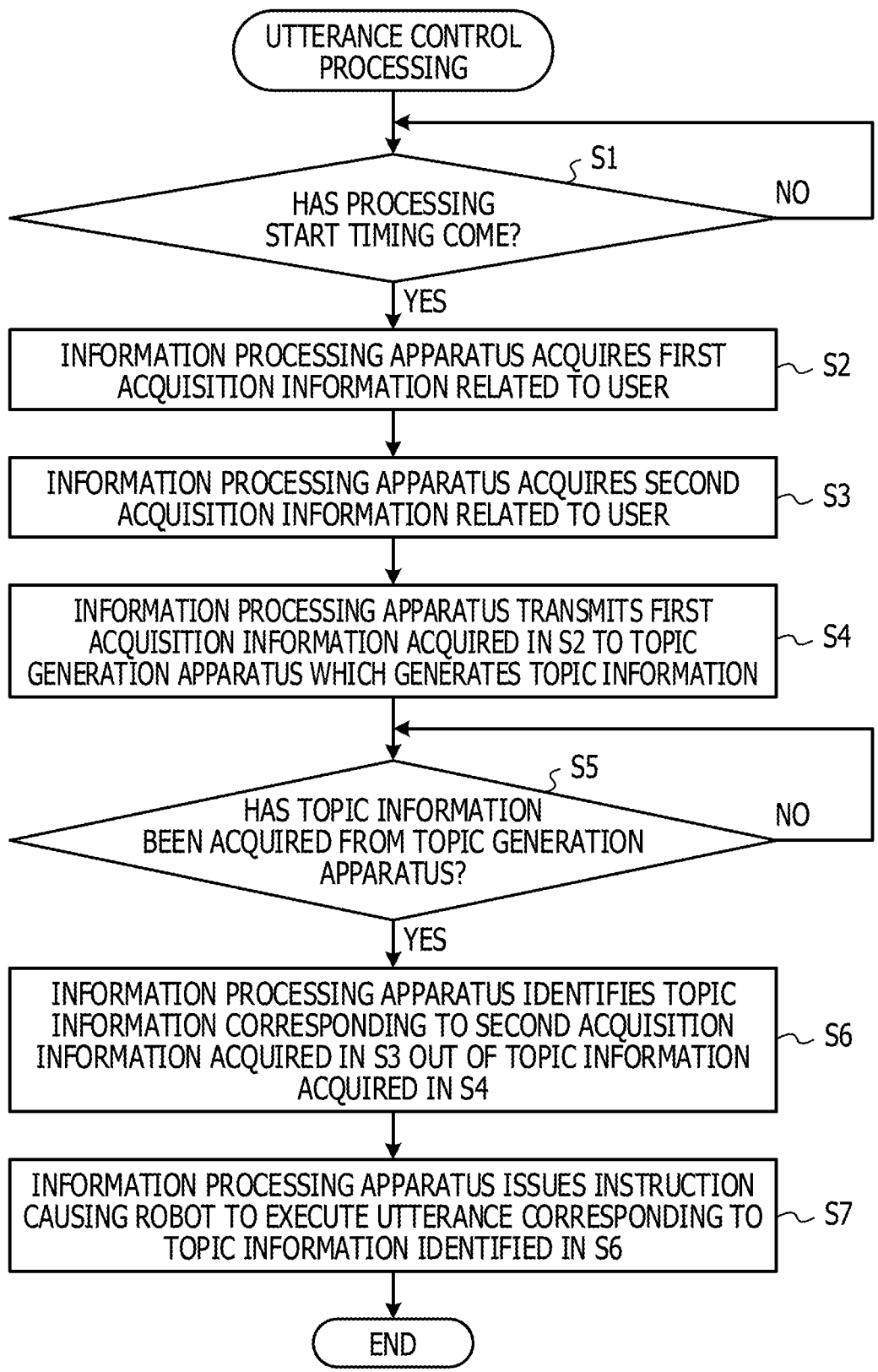
FIG. 6 is a flowchart for describing an overview of an utterance control processing according to a first embodiment.
Figure 7:
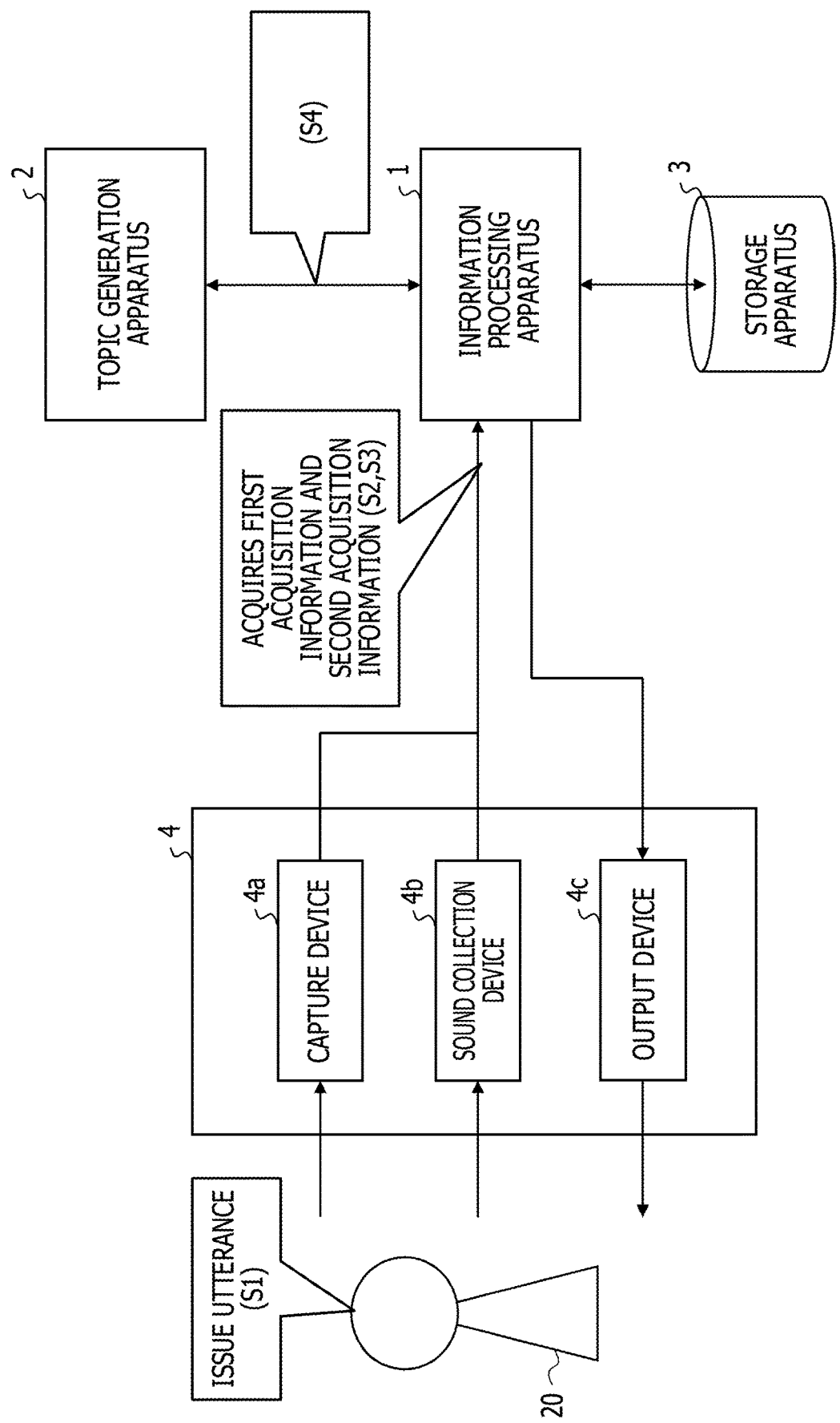
FIG. 7 is a diagram for describing an overview of the utterance control processing according to the first embodiment.
Figure 8:
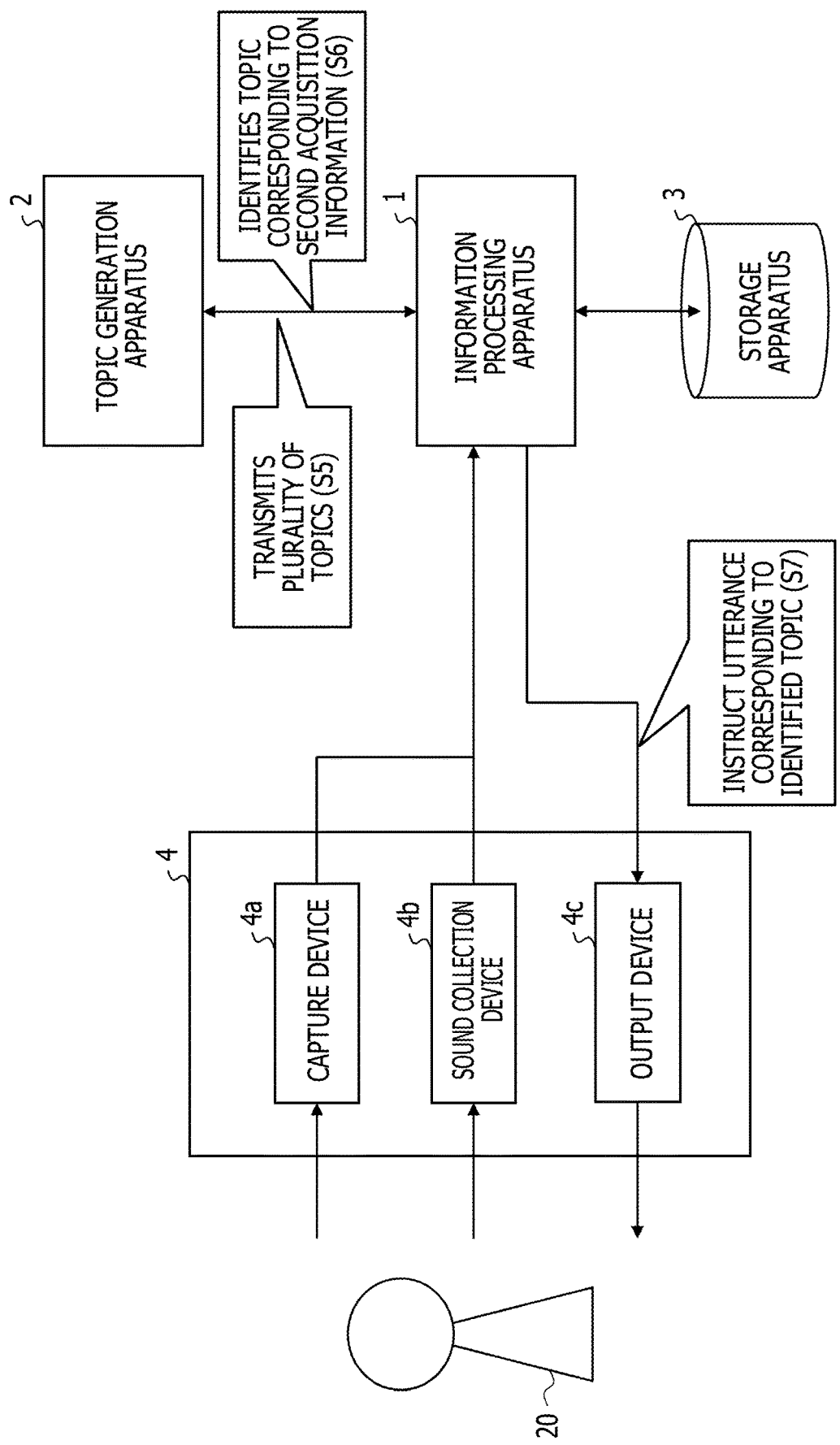
FIG. 8 is a diagram for describing an overview of the utterance control processing according to the first embodiment.

Next, an overview of the first embodiment is described. FIG. 6 is a flowchart for describing an overview of the utterance control processing in the first embodiment. FIGS. 7 and 8 are diagrams for describing an overview of the utterance control processing in the first embodiment. The utterance control processing in the first embodiment of FIG. 6 is described with reference to FIGS. 7 and 8.

[Overview of Utterance Control Processing]

First, an overview of the utterance control processing is described. FIG. 6 is a flowchart for describing an overview of the utterance control processing in the first embodiment.

As illustrated in FIG. 6, the information processing apparatus 1 waits until a processing start timing (S1: NO). For example, as illustrated in FIG. 7, the processing start timing is a timing when the user 20 utters.

Then, when the processing start timing comes (S1: YES), the information processing apparatus 1 acquires first acquisition information 131 related to the user 20 as illustrated in FIG. 7 (S2). In this case, as illustrated in FIG. 7, the information processing apparatus 1 acquires second acquisition information 132 related to the user 20 (S3).

Further, as illustrated in FIG. 7, the information processing apparatus 1 transmits the first acquisition information 131 acquired in S2 to the topic generation apparatus 2 which generates topic information 133 (S4).

Thereafter, as illustrated in FIG. 8, the information processing apparatus 1 waits until receiving the topic information 133 from the topic generation apparatus 2 (S5: NO). Then, upon receiving the topic information 133 from the topic generation apparatus 2 (S5: YES), as illustrated in FIG. 8, the information processing apparatus 1 identifies topic information 133 corresponding to the second acquisition information 132 acquired in the processing of S3, out of the topic information 133 acquired in the processing of S4 (S6). Further, as illustrated in FIG. 8, the information processing apparatus 1 outputs an instruction which causes the robot 4 to execute an utterance according to the topic information 133 identified in the processing of S6 (S7).

More specifically, for example, the topic generation apparatus 2 generates a plurality of topics in advance based on, for example, the content of user's utterance (first acquisition information). Then, the information processing apparatus 1, for example, identifies a topic more suitable as the topic to be uttered to the user among the plurality of topics generated by the topic generation apparatus 2, based on, for example, the user's current situation (second acquisition information). Thereafter, the robot 4 executes an utterance corresponding to the topic identified by the information processing apparatus 1.

Thus, the information processing apparatus 1 may cause the robot 4 to utter a topic according to the action, state, or situation of the user.

Details of First Embodiment

Next, details of the first embodiment are described. FIGS. 9 to 14 are flowcharts for describing details of the utterance control processing according to the first embodiment. FIGS. 15 to 23 illustrate details of the utterance control processing in the first embodiment. The utterance control processings illustrated in FIGS. 9 to 14 are described with reference to FIGS. 15 to 23.

[Information Acquisition Processing in Information Processing Apparatus]

Figure 9:
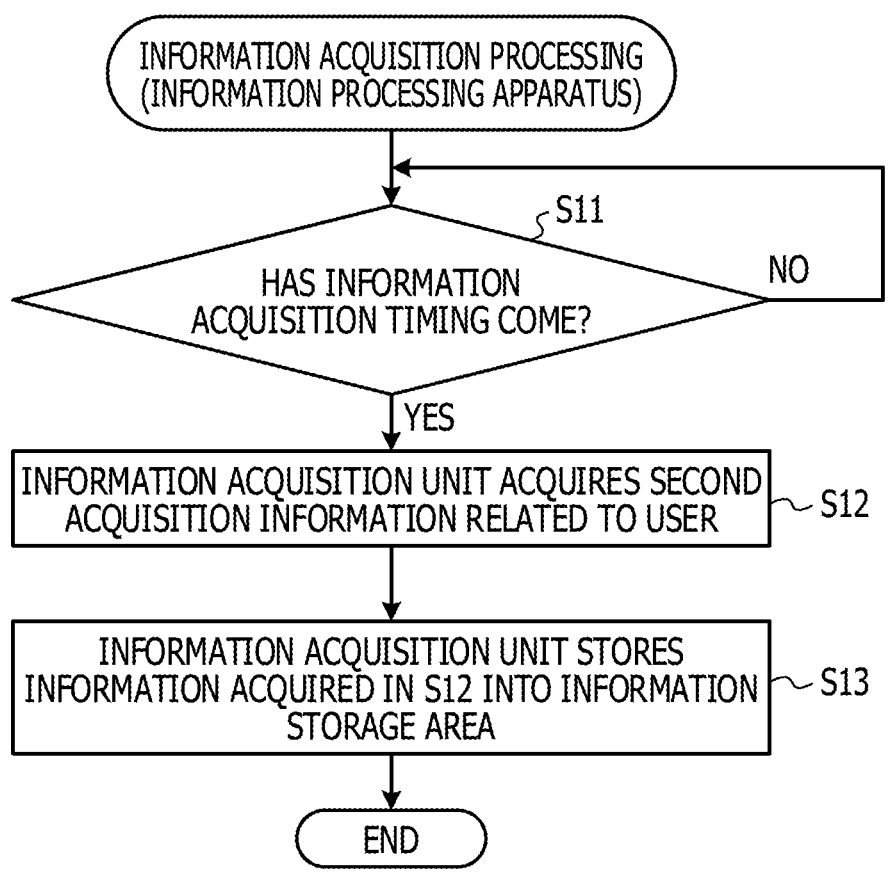
FIG. 9 is a flowchart for describing details of the utterance control processing according to the first embodiment.

First, among utterance control processings in the information processing apparatus 1, a processing of acquiring the second acquisition information 132 (hereinafter, alternatively referred to as information acquisition processing) is described. FIG. 9 is a flowchart illustrating the information acquisition processing.

As illustrated in FIG. 9, the information acquisition unit 111 of the information processing apparatus 1 waits until information acquisition timing (S11: NO). The information acquisition timing may be a regular timing such as, for example, every one minute.

Then, when the information acquisition timing comes (S11: YES), the information acquisition unit 111 acquires second acquisition information 132 related to the user (S12). Specifically, the information acquisition unit 111 acquires information related to, for example, the user's situation via the capture device 4a, and acquires the second acquisition information 132 by generating the second acquisition information 132 from the acquired information. Hereinafter, a specific example of the second acquisition information 132 is described.

[Specific Example of Second Acquisition Information]

FIG. 15 illustrates a specific example of the second acquisition information 132. The second acquisition information 132 illustrated in FIG. 15 includes, as items, "item number" which identifies individual information contained in the second acquisition information 132, "information type" indicating the type of individual information contained in the second acquisition information 132, and "value" to which information corresponding to the type set to "information type" is set. The second acquisition information 132 illustrated in FIG. 15 includes "key word" to which a key word corresponding to the information set to "value" is set.

Specifically, the information acquisition unit 111 sets "0.23, 0.71, −0.18" which are values related to the user's facial expression acquired by the capture device 4a to "value" of the information to which "user's facial expression" is set for every "information type" (information to which "1" is set to "item number"). The information acquisition unit 111 sets "smile" which is information corresponding to the information ("0.23, 0.71, −0.18") set to "key word", to "value" of the information to which "user's facial expression" is set for every "information type". More specifically, the information acquisition unit 111 determines from the information set to "value" that facial expression of the user who has issued an utterance is the smile, and sets "smile" to "key word".

The information acquisition unit 111 may, for example, refer to the information (not illustrated) which associates the information set to "value" and the information set to "key word" with each other, and identify the information to be set to "key word" from the information set to "value". Also, the information acquisition unit 111 may identify the information to be set to "key word" from the information set to "value" using a conversion parameter generated by machine learning of teaching data including the information set to "value" and the information to be set to "key word". Description of other information included in FIG. 15 is omitted.

Referring back to FIG. 9, the information acquisition unit 111 stores second acquisition information 132 acquired in the processing of S12 into the information storage area 130 (S13).

[Utterance Execution Processing (1) in Information Processing Apparatus]

Next, a processing of executing the utterance to the user (hereinafter, alternatively referred to as utterance execution processing) among utterance control processings in the information processing apparatus 1 is described. FIGS. 10 to 14 are flowcharts for illustrating the utterance execution processing.

Figure 10:
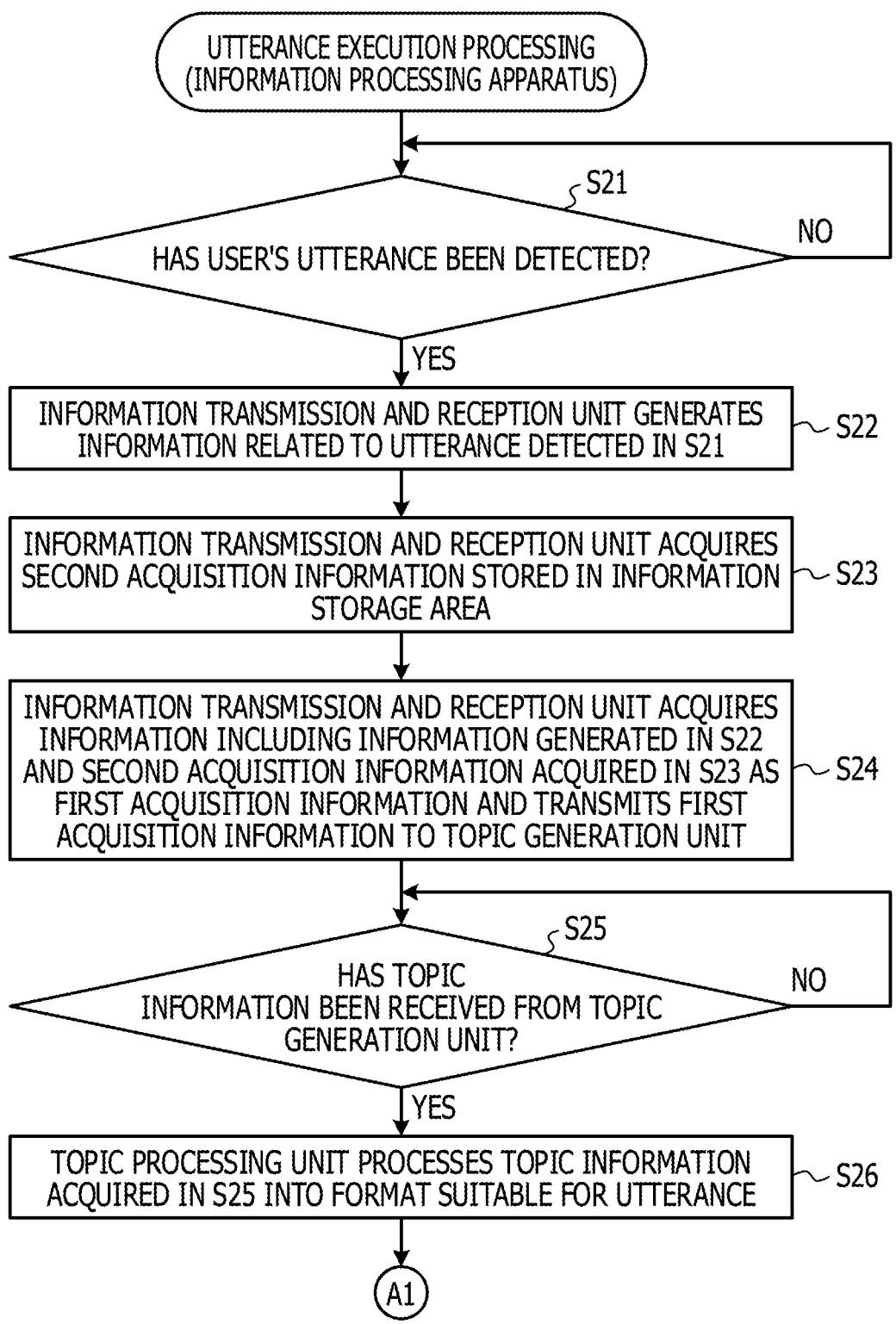
FIG. 10 is a flowchart for describing details of the utterance control processing according to the first embodiment.
Figure 11:
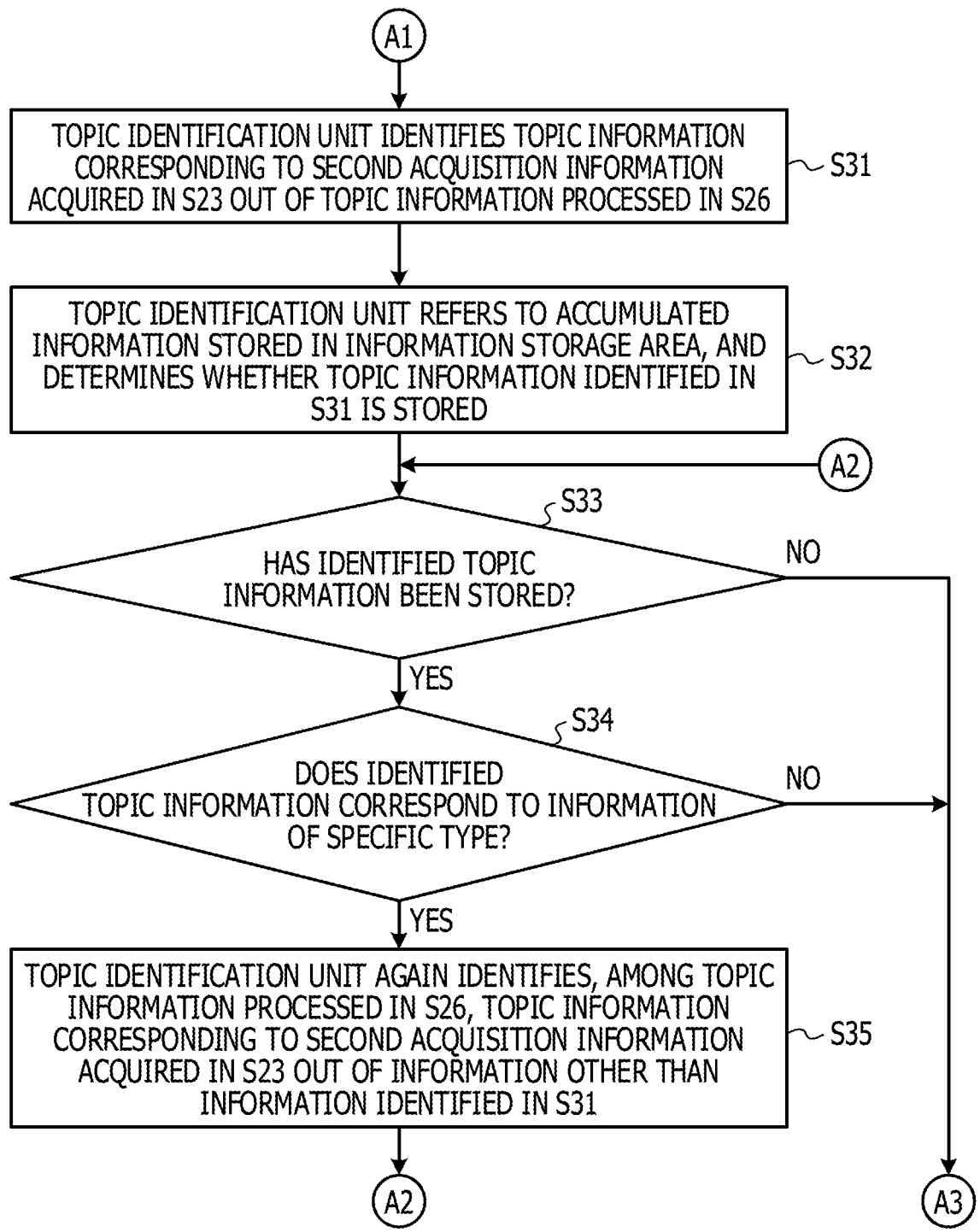
FIG. 11 is a flowchart for describing details of the utterance control processing according to the first embodiment.

As illustrated in FIG. 10, the information transmission and reception unit 112 of the information processing apparatus 1 waits until the utterance by the user is detected (S21: NO). Specifically, for example, the information transmission and reception unit 112 waits until the sound collection device 4b detects an utterance by the user.

Then, when the utterance by the user is detected (S21: YES), the information transmission and reception unit 112 generates the information related to the user's utterance detected in the processing of S21 (S22). Hereinafter, a specific example of the information acquired in the processing of S22 is described.

[Specific Example of Information Generated in Processing of S22]

FIG. 16 illustrates a specific example of the information acquired in the processing of S22. The information illustrated in FIG. 16 includes, as items, "item number" identifying individual information, "user identification information" identifying the user who has issued an utterance, and "content of utterance" in which content of user's utterance is set.

Specifically, as illustrated in FIG. 16, the information acquisition unit 111 sets, for example, "003" which is identification information of the user identified by the capture device 4a as the user who has issued the utterance, into "user identification information" of the information including "item number" of "1". Also, as illustrated in FIG. 16, the information acquisition unit 111 sets, for example, words of "Tomorrow is my friend's birthday" which are the content of the utterance acquired via the sound collection device 4b, into "content of utterance" of the information including "item number" of "1".

Referring back to FIG. 10, the information transmission and reception unit 112 acquires the second acquisition information 132 stored in the information storage area 130 (S23). Specifically, for example, the information transmission and reception unit 112 acquires last acquired information (newest information) among the second acquisition information 132 stored in the information storage area 130.

Next, for example, the information transmission and reception unit 112 acquires the information including the information generated in the processing of S22 and the second acquisition information 132 acquired in the processing of S23, as the first acquisition information 131. Then, the information transmission and reception unit 112 transmits the acquired first acquisition information 131 to the topic generation apparatus 2 (S24). Thereafter, the topic processing unit 113 of the information processing apparatus 1 waits until the topic information 133 is received from the topic generation apparatus 2 (S25: NO). Hereinafter, the utterance execution processing in the topic generation apparatus 2 is described. Processings following S25 of the utterance execution processing in the information processing apparatus 1 are described later.

[Utterance Execution Processing in Topic Generation Apparatus]

Figure 13:
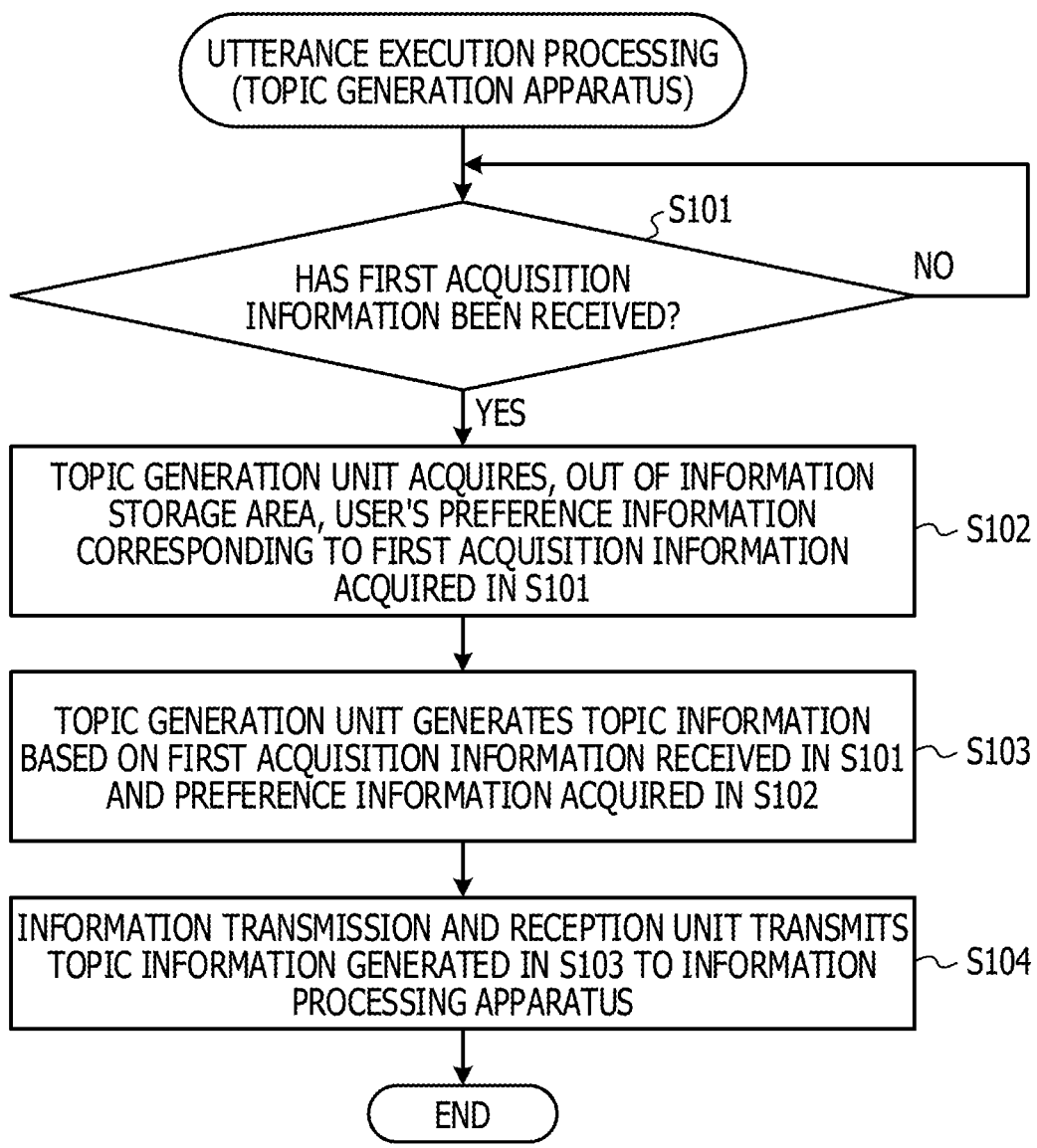
FIG. 13 is a flowchart for describing details of the utterance control processing according to the first embodiment.

FIG. 13 is a flowchart illustrating the utterance execution processing in the topic generation apparatus 2.

The information transmission and reception unit 211 of the topic generation apparatus 2, for example, waits until the first acquisition information 131 transmitted by the information processing apparatus 1 is received (S101: NO).

Then, for example, when the first acquisition information 131 is received (S101: YES), the topic generation unit 212 of the topic generation apparatus 2 refers to the information storage area 230 and acquires the preference information 231 of the user corresponding to the first acquisition information 131 acquired in the processing of S101 (S102). Hereinafter, a specific example of the preference information 231 is described.

[Specific Example of Preference Information]

FIG. 17 illustrates a specific example of the preference information 231. The preference information 231 illustrated in FIG. 17 is, among the preference information 231 stored in the information storage area 230, a specific example of the preference information 231 related to the user who has issued the utterance corresponding to the first acquisition information 131 described with reference to FIG. 16 (user whose "user identification information" in the first acquisition information 131 described with reference to FIG. 16 is "003").

The preference information 231 illustrated in FIG. 17 includes, as items, "item number" which identifies individual information contained in the preference information 231, "information type" indicating the type of individual information contained in the preference information 231, and "key word" to which the key word corresponding to the type set to "information type" is set.

Specifically, in the preference information 231 illustrated in FIG. 17, the information of "item number" of "1" includes "food" set as "information type" and "ice cream" set as "key word". Also, in the preference information 231 illustrated in FIG. 17, the information including "item number" of "2" includes "sport" set as "information type" and "soccer" set as "key word". Description of other information included in FIG. 17 is omitted.

Referring back to FIG. 13, the topic generation unit 212 generates the topic information 133 based on the first acquisition information 131 received in the processing of S101 and the preference information 231 acquired in the processing of S102 (S103). Specifically, for example, the topic generation unit 212 generates the topic information 133 indicating the content of a plurality of topics. Then, for example, the topic generation unit 212 stores the generated topic information 133 into the information storage area 230. Hereinafter, a specific example of the topic information 133 is described.

[Specific Example of Topic Information]

FIG. 18 illustrates a specific example of the topic information 133. The topic information 133 illustrated in FIG. 18 includes, as items, "item number" identifying individual information contained in the topic information 133, and "topic" to which the content of topic generated by the topic generation unit 212 is set.

Specifically, the topic generation unit 212 refers to "ice cream" which is the information set to "key word" of the information including "item number" of "1" in the preference information 231 described with reference to FIG. 17, and generates the topic of "Which ice cream shop you visited recently?" Then, as illustrated in FIG. 18, the topic generation unit 212 sets, for example, wordings of "Which ice cream shop you visited recently?" to "topic" of the information including "item number" of "1".

Also, the topic generation unit 212 refers to "smile" which is the information set to "key word" of the information including "item number" of "1" in the second acquisition information 132 described with reference to FIG. 15, and generates the topic of "Good smile! Got anything good?" Then, as illustrated in FIG. 18, the topic generation unit 212 sets, for example, wordings of "Good smile Got anything good?" to "topic" of the information including "item number" of "2".

For example, the topic generation unit 212 may use conversion parameters generated by machine learning of a plurality of teaching data respectively including the information set to "content of utterance" of the first acquisition information 131, "key word" of the second acquisition information 132, or "key word" of the preference information 231 and the topic generated by the topic generation unit 212, and thereby identify the information to be set to "topic". Description of other information included in FIG. 18 is omitted.

Referring back to FIG. 13, the information transmission and reception unit 211 transmits the topic information 133 generated in the processing of S103 to the information processing apparatus 1.

[Utterance Execution Processing (2) in Information Processing Apparatus]

Next, among the utterance execution processing in the information processing apparatus 1, processings following S25 are described.

As illustrated in FIG. 10, when the topic information 133 is received from the topic generation apparatus 2 (S25: YES), the topic processing unit 113 processes the acquired topic information 133 into a format suitable for the utterance (S26). Hereinafter, a specific example of the topic information 133 subjected to the processing of S26 is described.

[Specific Example of Topic Information Subjected to Processing of S26]

FIG. 19 is a diagram for illustrating a specific example of topic information 133 subjected to the processing of S26.

For example, wordings of "A new single of XXX is released on x-th day of o month" are set to "topic" of the information including "item number" of "3" in the topic information 133 illustrated in FIG. 18, and information acquired from an external network is also set thereto as is.

Therefore, in the processing of S26, the topic processing unit 113 processes, as illustrated in FIG. 19, wordings of "A new single of XXX is released on x-th day of o month" into wordings (information in a format suitable for the utterance) of "A new single of XXX will be released at the end of the next week". Description of other information included in FIG. 19 is omitted.

Referring back to FIG. 11, the topic identification unit 114 of the information processing apparatus 1 identifies the topic information 133 corresponding to the second acquisition information 132 acquired in the processing of S23 from the topic information 133 processed in the processing of S26 (S31). Specifically, the topic identification unit 114 identifies a topic most suitable for the content of the second acquisition information 132 acquired in the processing of S23 from a plurality of topics indicated by the topic information 133 processed in the processing of S26. Hereinafter, details of the processing of S31 are described.

[Details of Processing of S31]

Figure 14:
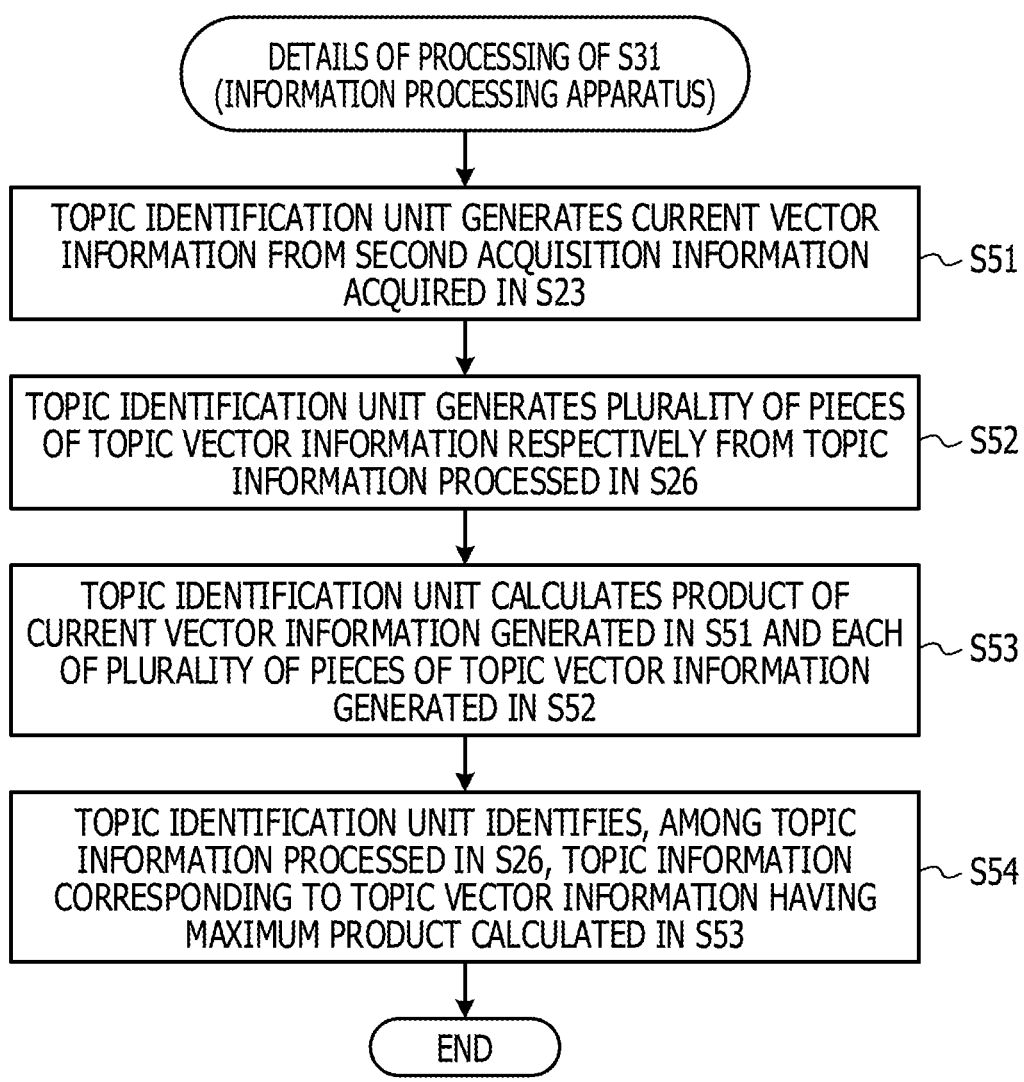
FIG. 14 is a flowchart for describing details of the utterance control processing according to the first embodiment.

FIG. 14 illustrates details of the processing of S31.

The topic identification unit 114 generates current vector information 134 from the second acquisition information 132 acquired in the processing of S23 (S51). The current vector information 134 is the information digitalizing the user's current situation. Specifically, the current vector information 134 is expressed, for example, as n×one-dimensional matrix.

Then, the topic identification unit 114 generates a plurality of pieces of topic vector information 135 respectively from each of topic information 133 processed in the processing of S26 (S52). The topic vector information 135 is information digitalizing the user's situation suitable for each of topics. Specifically, the topic vector information 135 is expressed, for example, as n×one-dimensional matrix. Hereinafter, specific examples of the current vector information 134 and the topic vector information 135 are described.

[Specific Examples of Current Vector Information and Topic Vector Information]

FIGS. 20A and 20B illustrate specific examples of the current vector information 134 and the topic vector information 135. FIG. 20A illustrates a specific example of the current vector information 134. FIG. 20B illustrates a specific example of the topic vector information 135.

Specifically, for example, "0.23, 0.71, −0.18", "4", and "6.7, 0.25" are set to "value" of the second acquisition information 132 described with reference to FIG. 15. Therefore, as illustrated in FIG. 20A, the topic identification unit 114 generates the current vector information 134 so as to include "0.23, 0.71, −0.18", "4", "6.7, 0.25" which are information set to "value" of the second acquisition information 132 described with reference to FIG. 15, as components.

"Which ice cream shop you visited recently?" is set to "topic" of the information including "item number" of "1" in the topic information 133 described with reference to FIG. 19. Therefore, the topic identification unit 114, for example, divides "Which ice cream shop you visited recently?" into "which", "ice", "cream", "shop", "you", "visited", and "recently". Then, the topic identification unit 114 identifies a numeric value corresponding to each of divided wordings. Specifically, for example, the topic identification unit 114 refers to the information (not illustrated) associating each of the divided wordings and the value with each other, and identifies a value corresponding to each of the divided wordings. Thereafter, as illustrated in FIG. 20B, the topic identification unit 114 generates the topic vector information 135 so as to include each of the identified values as a component.

Referring back to FIG. 14, the topic identification unit 114 calculates the product of the current vector information 134 generated in the processing of S51 and each of the plurality of pieces of topic vector information 135 generated in the processing of S52 (S53). Hereinafter, a specific example of the processing of S53 is described.

[Specific Example of Processing of S53]

FIG. 21 illustrates a specific example of the processing of S53. As illustrated in FIG. 21, the topic identification unit 114 calculates, for example, "4.21" as a product of a matrix representing the current vector information 134 described with reference to FIG. 20A as 1×n-th dimensional matrix and a matrix representing the topic vector information 135 described with reference to FIG. 20B. In the same manner, the topic identification unit 114 calculates a product of a matrix representing the current vector information 134 described with reference to FIG. 20A as 1×n-th dimensional matrix, and a matrix indicating the plurality of pieces of topic vector information 135 generated in the processing of S52.

Referring back to FIG. 14, the topic identification unit 114 identifies, among topic information 133 processed in the processing of S26, topic information 133 corresponding to topic vector information 135 having a maximum product calculated in the processing of S53 (S54).

More specifically, the topic identification unit 114 identifies, among the plurality of topics indicated by topic information 133 generated by the topic generation apparatus 2, a topic indicated by topic information 133 corresponding to topic vector information 135 having a maximum product calculated in the processing of S53 as a topic most suitable for the user's current action, state or situation.

This inhibits the robot 4 from issuing an utterance corresponding to a topic not suitable to, for example, the user's current situation.

Referring back to FIG. 11, the topic identification unit 114 refers to the accumulated information 136 stored in the information storage area 130 and determines whether topic information 133 identified in the processing of S31 is stored (S32). Hereinafter, a specific example of the accumulated information 136 is described.

[Specific Example of Accumulated Information]

FIGS. 22 and 23 illustrate specific examples of the accumulated information 136. The accumulated information 136 illustrated, for example, in FIG. 22 includes, as items, "item number" identifying individual information contained in the accumulated information 136, "topic" to which individual topics are set, and "user's reaction" to which information indicating the user's reaction to utterances issued by the robot 4 in the past regarding the content set to "topic" is set.

Specifically, in the accumulated information 136 illustrated in FIG. 22, information including "item number" of "1" includes "topic" to which "Today is hotter than yesterday" is set, and "smile" to which "user's reaction" is set. More specifically, the information including "item number" of "1" in the accumulated information 136 illustrated in FIG. 22 indicates that when the robot 4 has issued the utterance consisting of wordings of "Today is hotter than yesterday" in the past, user's facial expression was smile.

Also, in the accumulated information 136 illustrated in FIG. 22, information including "item number" of "3" includes "topic" to which "Good smile! Got anything good?" is set, and "user's reaction" to which "anger" is set. More specifically, the information including "item number" of "3" in the accumulated information 136 illustrated in FIG. 22 indicates that when the robot 4 has issued the utterance consisting of wordings of "Good smile! Got anything good?" in the past, user's facial expression was anger.

Referring back to FIG. 11, the topic identification unit 114, which has determined that the topic information 133 identified in the processing of S31 is stored (S33: YES), determines whether the identified topic information 133 corresponds to information of specific type in the accumulated information 136 (S34). Then, the topic identification unit 114, which has determined that the identified topic information 133 corresponds to information of specific type (S34: YES), again identifies, among topic information 133 processed in the processing of S26, topic information 133 corresponding to the second acquisition information 132 acquired in the processing of S23 out of topic information 133 other than information identified in the processing of S31 (S35). Thereafter, the topic identification unit 114 performs processings of steps following S33 again.

Specifically, in the accumulated information 136 described with reference to FIG. 22, information including "topic" to which "Good smile! Got anything good?" is set includes "user's reaction" to which "anger" is set. Therefore, for example, when wordings set to "topic" in the topic information 133 identified in the processing of S31 are "Good smile! Got anything good?" and the information of specific type in the processing of S34 is "anger", the topic identification unit 114 determines that the topic information 133 identified in the processing of S31 corresponds to the information of specific type. Then, in this case, the topic identification unit 114 identifies, among wordings set to "topic" in the topic information 133 described with reference to FIG. 19, for example, wordings whose product calculated in the processing of S53 is higher next to "Good smile! Got anything good?" out of wordings other than "Good smile! Got anything good?"

More specifically, in a case where the user has negatively reacted to an utterance corresponding to the identified topic information 133 in the past, the topic identification unit 114 does not cause the robot 4 to issue an utterance corresponding to the identified topic information 133. This enables the information processing apparatus 1 to smoothly communicate with the user.

Figure 12:
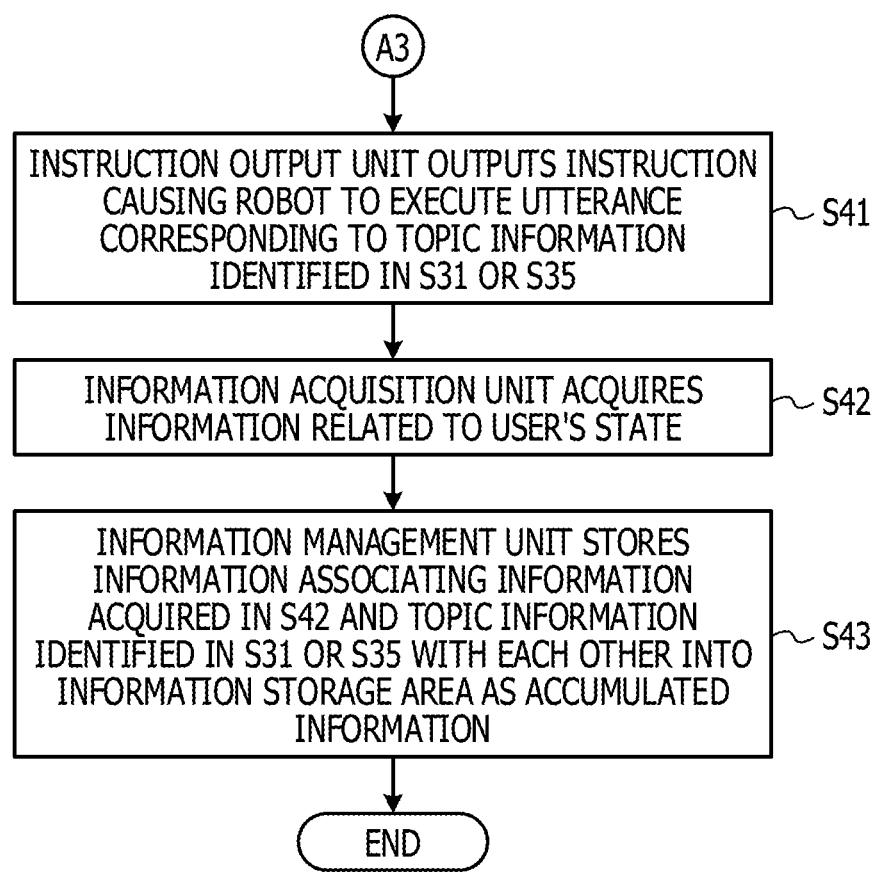
FIG. 12 is a flowchart for describing details of the utterance control processing according to the first embodiment.

On the other hand, when the topic identification unit 114 determines that the topic information 133 identified in the processing of S31 is not stored (S33: NO) or the identified topic information 133 does not corresponds to the information of specific type (S34: NO), the instruction output unit 115 of the information processing apparatus 1 outputs an instruction causing the robot 4 to execute an utterance corresponding to the topic information 133 identified in the processing of S31 or S35 as illustrated in FIG. 12 (S41).

Thereafter, the information acquisition unit 111 acquires information related to the user's current state (S42). Then, the information management unit 116 of the information processing apparatus 1 stores information associating the information related to the acquired user's current state and the topic information identified in the processing of S31 or S35 with each other into the information storage area 130 as the accumulated information 136 (S45). More specifically, the information management unit 116 generates new accumulated information 136 from the information related to the user's state (information indicating the user's reaction) to the present utterance issued by the robot 4, and stores into the information storage area 130.

Specifically, when wordings set to "topic" of the identified topic information 133 in the processing of S31 or S35 are "What present you give?", the information management unit 116 sets "What present you give?" to "topic" of the information including "item number" of "4" as illustrated in FIG.

23. Then, the information management unit 116 sets "smile" to "user's reaction" of the information including "item number" of "4".

Thus, the information processing apparatus 1 according to this embodiment acquires the first acquisition information 131 and the second acquisition information 132 related to the user. Then, the information processing apparatus 1 transmits the acquired first acquisition information 131 to the topic generation apparatus 2 which generates the topic. Thereafter, the information processing apparatus 1, which has acquired a plurality of topics generated by the topic generation apparatus 2 based on the first acquisition information 131, identifies a topic corresponding to the acquired second acquisition information 132 out of the acquired plurality of topics. Further, the information processing apparatus 1 outputs an instruction which causes the robot 4 to execute an utterance corresponding to the identified topic.

More specifically, for example, the topic generation apparatus 2 generates a plurality of topics in advance based on, for example, the content of user's utterance (first acquisition information). Then, the information processing apparatus 1, for example, identifies a topic more suitable as a topic to be uttered to the user among the plurality of topics generated by the topic generation apparatus 2, based on, for example, the user's current situation (second acquisition information). Thereafter, the robot 4 executes an utterance corresponding to the topic identified by the information processing apparatus 1.

Thus, the information processing apparatus 1 may cause the robot 4 to utter a topic according to the user's action, state, or situation.

Second Embodiment

Figure 24:
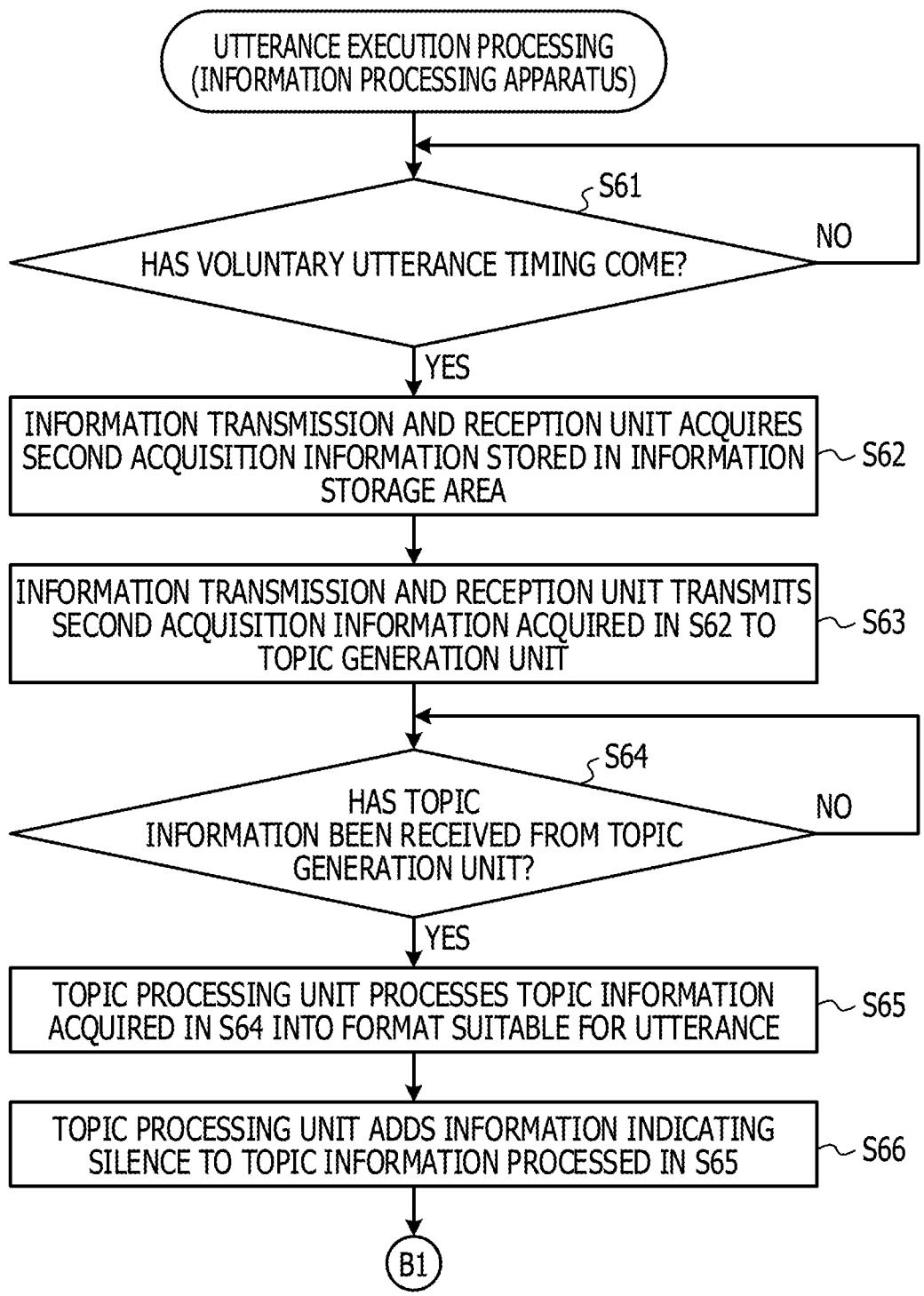
FIG. 24 is a flowchart for describing an utterance control processing according to a second embodiment.
Figure 25:
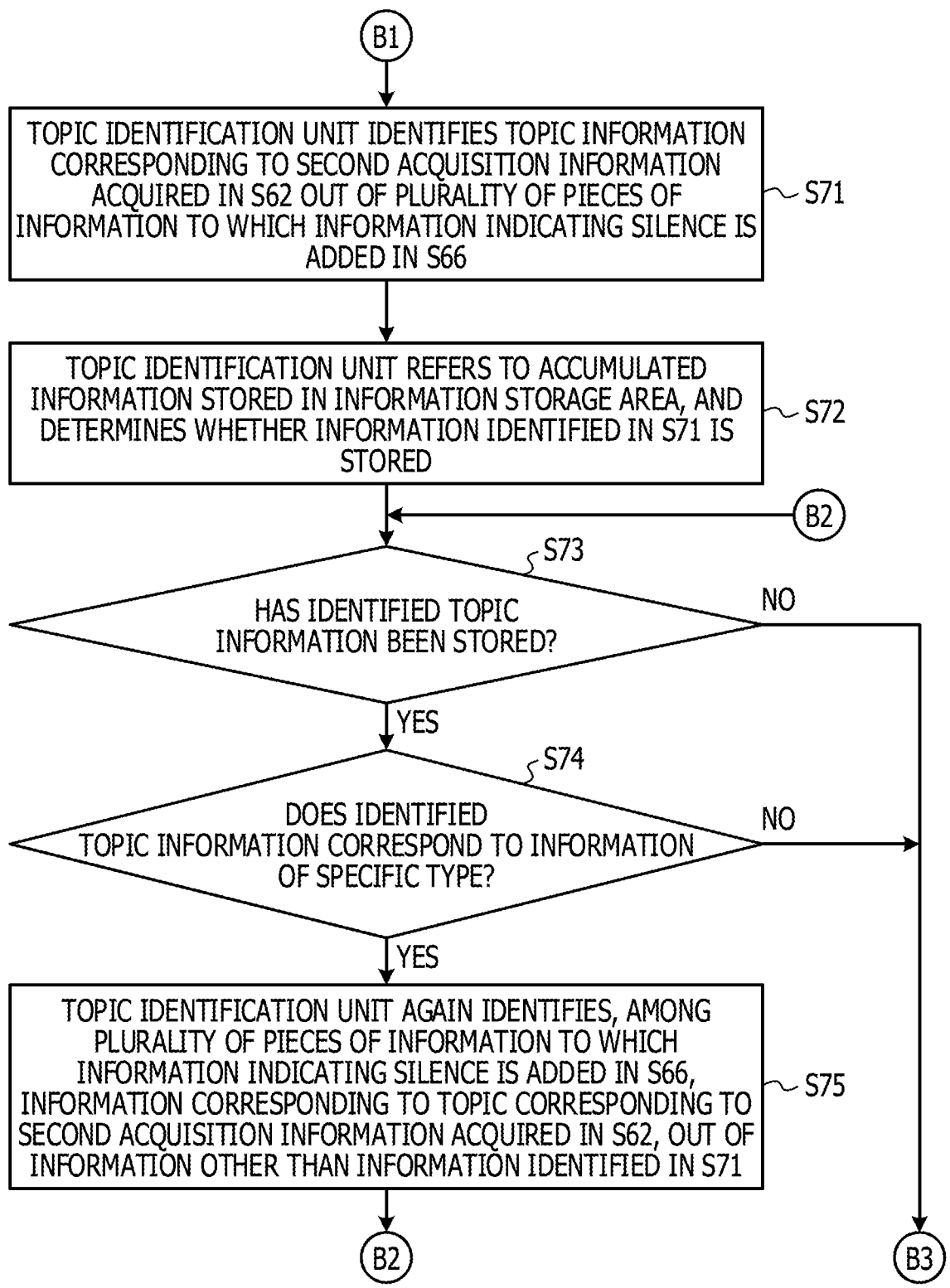
FIG. 25 is a flowchart for describing an utterance control processing according to the second embodiment.
Figure 26:
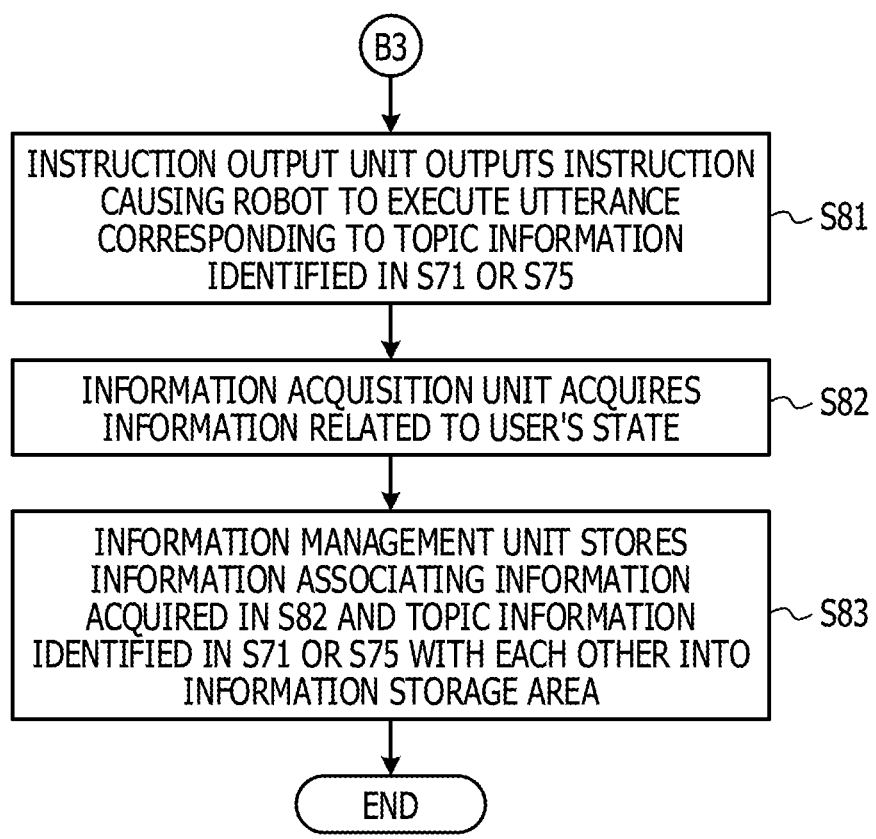
FIG. 26 is a flowchart for describing an utterance control processing according to the second embodiment.

Next, an utterance control processing according to a second embodiment is described. FIGS. 24 to 26 are flowcharts for describing the utterance control processing in the second embodiment. FIGS. 27 and 28 are flowcharts for illustrating the utterance control processing in the second embodiment. The utterance control processing illustrated in FIGS. 24 to 26 is described with reference to FIGS. 27 and 28.

The information processing apparatus 1 according to the first embodiment starts the utterance execution processing in response to an utterance of the user. On the other hand, an information processing apparatus 1 according to the second embodiment starts the utterance execution processing voluntarily when there is no utterance by the user for a predetermined period of time. This enables the information processing apparatus 1 to cause the robot 4 to utter a topic corresponding to the user's action, state or situation even when the user does not utter after elapse of a predetermined period of time. Hereinafter, the utterance execution processing according to the second embodiment is described. Hereinafter, description of processings same as the first embodiment is omitted.

[Utterance Execution Processing in Information Processing Apparatus]

The information transmission and reception unit 112 waits until a voluntary execution timing (S61: NO). The voluntary execution timing may be, for example, a timing when a predetermined period of time elapses since the last utterance by the user and the user stays near the robot 4.

Then, when the voluntary execution timing comes (S61: YES), the information transmission and reception unit 112 acquires the second acquisition information 132 stored in the information storage area 130 (S62). More specifically, the utterance execution processing according to the second embodiment is not a processing which starts every time the user executes an utterance. Therefore, for example, the information transmission and reception unit 112 according to the second embodiment may not acquire information related to the user's utterance.

Next, the information transmission and reception unit 112 transmits the second acquisition information 132 acquired in the processing of S62 to the topic generation apparatus 2 (S63). Then, the topic processing unit 113 waits until receiving the topic information 133 from the topic generation apparatus 2 (S64: NO).

Thereafter, when the topic information 133 is received from the topic generation apparatus 2 (S64: YES), the topic processing unit 113 processes the acquired topic information 133 into a format suitable for the utterance (S65). Then, the topic processing unit 113 adds information indicating silence to the processed topic information 133 (S66). Hereinafter, specific examples of the topic information 133 received in the processing of S64 and the topic information 133 with the information indicating silence added in the processing of S66 are described.

[Specific Example of Topic Information According to Second Embodiment]

FIG. 27 illustrates a specific example of the topic information 133 according to the second embodiment. Specifically, FIG. 27 illustrates a specific example of the topic information 133 received in the processing of S64.

The topic information 133 illustrated in FIG. 27 does not include information including "item number" of "4" (topic generated from information related to the user's utterance) in the topic information 133 described with reference to FIG. 18. More specifically, unlike the first embodiment, the information transmission and reception unit 112 according to the second embodiment does not transmit information related to the user's utterance to the topic generation apparatus 2. Therefore, as illustrated in FIG. 27, the topic information 133 received in the processing of S64 does not include the topic generated from the information related to the user's utterance.

[Specific Example of Topic Information to which Information Indicating Silence is Added in Processing of S66]

Next, a specific example of the topic information 133 to which information indicating silence is added in the processing of S66. FIG. 28 illustrates a specific example of the topic information 133 to which information indicating silence is added in the processing of S66.

As illustrated in FIG. 28, the topic processing unit 113 sets, for example, "(silence)" indicating no utterance to the user as "topic" of information including "item number" of "4". More specifically, the utterance execution processing according to the second embodiment is not a processing which starts in response to the use's utterance. Therefore, in the execution of the utterance execution processing, the user may not desire an utterance by the robot 4. Thus, for example, as illustrated in FIG. 28, the topic processing unit 113 adds information in which "(silence)" is set (information including "item number" of "4") to "topic".

This enables the topic identification unit 114, for example, to identify information including "topic" to which "(silence)" is set, when determined that the user is in a situation where the utterance by the robot 4 is not desired.

Referring back to FIG. 25, the topic identification unit 114 identifies topic information 133 corresponding to the second acquisition information 132 acquired in the processing of S62 from the topic information 133 to which information indicating silence is added in the processing of S66 (S71).

Then, the topic identification unit 114 refers to the accumulated information 136 stored in the information storage area 130 and determines whether the topic information 133 identified in the processing of S71 is stored (S72).

As a result, the topic identification unit 114, which has determined that the topic information 133 identified in the processing of S71 is stored (S73: YES), determines whether the identified topic information 133 corresponds to information of specific type in the accumulated information 136 (S74). Then, the topic identification unit 114, which has determined that the identified topic information 133 corresponds to the information of specific type (S74: YES), identifies again, among topic information 133 to which information indicating silence is added in the processing of S66, topic information 133 corresponding to the second acquisition information 132 acquired in the processing of S62 out of topic information 133 other than information identified in the processing of S71 (S75). Thereafter, the topic identification unit 114 performs processings following S73 again.

On the other hand, when the topic identification unit 114 determines that the topic information 133 identified in the processing of S71 is not stored (S73: NO) or that the identified topic information 133 does not correspond to the information of specific type (S74: NO), the instruction output unit 115 outputs an instruction causing the robot 4 to execute an utterance corresponding to the topic information 133 identified in the processing of S71 or S75 (S81).

Thereafter, the information acquisition unit 111 acquires information related to the user's current state (S82). Then, the information management unit 116 stores information associating the information acquired in the processing of S82 and the topic information 133 identified in the processing of S71 or S75 with each other into the information storage area 130 as the accumulated information 136 (S83).

This enables the information processing apparatus 1 to cause the robots 4 to utter a topic according to the user's situation even when the user does not utter after elapse of a predetermined period of time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the computer controlling an utterance of a robot, the process comprising:
    detecting an utterance of a person by using a microphone;
    obtaining, in response to the detecting, pieces of response information for the utterance of the person based on first information indicating a content of the utterance of the person;
    obtaining second information relating to at least one of the person and a facial expression of the person identified by using an image of a face of the person taken by a camera;
    selecting specified first response information among the pieces of response information based on the second information;
    when the specified first response information corresponds to previous response information related to a negative reaction of the person identified by using the facial expression of the person after causing the robot to execute a response in accordance with pieces of response information, selecting specified second response information which is different from the specified first response information from among the pieces of response information based on the second information;
    generating utterance information including the specified second response information and information indicating that the robot does not speak to the person; and
    transmitting, to the robot, an instruction that causes the robot to execute a response in accordance with the utterance information of the robot.

2. The non-transitory computer-readable storage medium according to claim 1, wherein
    the obtaining the pieces of response information comprises:
        transmitting the first information to a generation unit that generates the pieces of response information based on the second information; and
        receiving the pieces of response information from the generation unit.

3. The non-transitory computer-readable storage medium according to claim 2, wherein
    the generation unit includes a plurality of generation units different from each other.

4. The non-transitory computer-readable storage medium according to claim 2, wherein the process further comprises:
    obtaining information relating to a state of the person in response to the response by the robot;
    storing, to a storage device, the information relating to the state in association with the specified response information; and
    determining whether the state indicated by the information associated with the specified response information is a specified state; and wherein
    when the state indicated by the information associated with the first specified response information or the second specified response information is the specified state, the first specified response information or the second specified response information corresponding to the specified state is prevented to be selected in the selecting.

5. The non-transitory computer-readable storage medium according to claim 2, wherein
    the first information and the second information is obtained upon elapse of a predetermined period of time since the detecting the utterance of the person.

6. The non-transitory computer-readable storage medium according to claim 1, wherein
    the pieces of response information includes response information indicating that no utterance to the person; and
    the utterance to the person by a robot is prevented when the specified first response information or the specified second response information is the response information indicating that no utterance.

7. The non-transitory computer-readable storage medium according to claim 1, wherein
    the first information and the second information is obtained in response to the detecting the utterance of the person.

8. The non-transitory computer-readable storage medium according to claim 1, wherein
the first information and the second information is obtained upon elapse of a predetermined period of time since the detecting the utterance of the person.

9. An utterance control method executed by a computer, the computer controlling an utterance of a robot, the process comprising:
   detecting an utterance of a person by using a microphone;
   obtaining, in response to the detecting, pieces of response information for the utterance of the person based on first information indicating a content of the utterance of the person;
   obtaining second information relating to at least one of the person and a a facial expression of the person identified by using an image of a face of the person taken by a camera;
   selecting specified first response information among the pieces of response information based on the second information;
   when the specified first response information corresponds to previous response information related to a negative reaction of the person identified by using the facial expression of the person after causing the robot to execute a response in accordance with pieces of response information, selecting specified second response information which is different from the specified first response information from among the pieces of response information based on the second information;
   generating utterance information including the specified second response information and information indicating that the robot does not speak to the person; and
   transmitting, to the robot, an instruction that causes the robot to execute a response in accordance with the utterance information of the robot.

10. An utterance control device comprising:
    a memory; and
    a processor coupled to the memory and the processor configured to execute a process, the process comprising:
       detecting an utterance of a person by using a microphone;
       obtaining, in response to the detecting, pieces of response information for the utterance of the person based on first information indicating a content of the utterance of the person;
       obtaining second information relating to at least one of the person and a facial expression of the person identified by using an image of a face of the person taken by a camera;
       selecting specified first response information among the pieces of response information based on the second information;
          when the specified first response information corresponds to previous response information related to a negative reaction of the person identified by using the facial expression of the person after causing a robot to execute a response in accordance with pieces of response information, selecting specified second response information which is different from the specified first response information from among the pieces of response information based on the second information;
       generating utterance information including the specified second response information and information indicating that the robot does not speak to the person; and
    transmitting, to the robot, an instruction that causes the robot to execute a response in accordance with the specified second response information the utterance information of the robot.

* * * * *